(12) United States Patent
Yamada

(10) Patent No.: US 8,228,546 B2
(45) Date of Patent: Jul. 24, 2012

(54) PRINTING SYSTEM AND SERVER THEREFOR

(75) Inventor: Akihiro Yamada, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 447 days.

(21) Appl. No.: 12/612,285

(22) Filed: Nov. 4, 2009

(65) Prior Publication Data

US 2010/0118340 A1    May 13, 2010

(30) Foreign Application Priority Data

Nov. 10, 2008    (JP) .................................. 2008-287805

(51) Int. Cl.
*G06F 3/12* (2006.01)

(52) U.S. Cl. ........................... 358/1.15; 358/1.1; 358/1.9

(58) Field of Classification Search .................... 358/1.1, 358/1.15

See application file for complete search history.

(56) References Cited

U.S. PATENT DOCUMENTS

| 2004/0239992 | A1* | 12/2004 | Kawai et al. | 358/1.15 |
| 2006/0221388 | A1* | 10/2006 | Yoshikawa et al. | 358/1.15 |
| 2008/0094657 | A1* | 4/2008 | Ikegami et al. | 358/1.15 |

FOREIGN PATENT DOCUMENTS

| JP | 2002-073312 A | 3/2002 |
| JP | 2004-145627 A | 5/2004 |
| JP | 2004-343416 | 12/2004 |
| JP | 2005-275727 A | 10/2005 |
| JP | 2006-251904 | 9/2006 |
| JP | 2008-186063 A | 8/2008 |
| WO | WO 03/060689 A1 | 7/2003 |

OTHER PUBLICATIONS

Japanese Official Action dated Jul. 20, 2010 with translation.

* cited by examiner

*Primary Examiner* — King Poon
*Assistant Examiner* — Iriana Cruz
(74) *Attorney, Agent, or Firm* — Scully, Scott, Murphy & Presser, PC

(57) ABSTRACT

A printing system includes a server and a plurality of printing devices connected with the server via a network. A maximum number of printable sheets is set for each of the printing devices. Upon receipt of a print request, when determining that a remaining number of printable sheets is insufficient, a first printing device issues a transfer request to the server. In response to the transfer request, the server selects a second printing device that cedes at least part of the maximum number of printable sheets therefore, based on respective frequencies of printing operations of the printing devices other than the first printing device, and issues a transfer instruction to each of the first printing device and the second printing device, the transfer instruction causing the first and second printing devices to increase and decrease their maximum numbers of printable sheets, respectively.

11 Claims, 14 Drawing Sheets

( 1st MFP ) PRINT HISTORY INFORMATION MANAGED BY 1st MFP

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 15 | 100 | 85 |
| 2 | Copy | 20 | 100 | 65 |
| 3 | Copy | 20 | 100 | 45 |
| 4 | FAX | 10 | 100 | 35 |
| 5 | Copy | 20 | 100 | 15 |
| NUMBER OF TIMES TO REACH MAXIMUM | | 5 | AVERAGE NUMBER OF PRINTED SHEETS(SHEETS/DAY) | 85 |

( 2nd MFP ) PRINT HISTORY INFORMATION MANAGED BY 2nd MFP

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 2 | 100 | 98 |
| 2 | FAX | 8 | 100 | 90 |
| 3 | Copy | 40 | 100 | 50 |
| NUMBER OF TIMES TO REACH MAXIMUM | | 3 | AVERAGE NUMBER OF PRINTED SHEETS(SHEETS/DAY) | 45 |

PRINT HISTORY INFORMATION FOR EACH MFP THAT IS MANAGED BY SERVER

| No. | DEVICE NAME | NUMBER OF PRINTED SHEETS | MAXIMUM NUMBER OF PRINTABLE SHEETS | REMAINING NUMBER OF PRINTABLE SHEETS | NUMBER OF TIMES NUMBER OF PRINTED SHEETS HAS EVER REACH MAXIMUM NUMBER OF PRINTABLE SHEETS | AVERAGE NUMBER OF PRINTED SHEETS (SHEETS/DAY) |
|---|---|---|---|---|---|---|
| 1 | 1st MFP | 0 | 100 | 100 | 5 | 85 |
| 2 | 2nd MFP | 0 | 100 | 100 | 3 | 45 |
| 3 | 3rd MFP | 0 | 100 | 100 | 2 | 100 |
| 4 | 4th MFP | 0 | 100 | 100 | 1 | 40 |

FIG. 3

FIG. 4A — PRINT HISTORY INFORMATION MANAGED BY 1st MFP

⟨1st MFP⟩

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 15 | 100 | 85 |
| 2 | Copy | 20 | 100 | 65 |
| 3 | Copy | 20 | 100 | 45 |
| 4 | FAX | 10 | 100 | 35 |
| 5 | Copy | 20 | 100 | 15 |
| NUMBER OF TIMES TO REACH MAXIMUM | | 5 | AVERAGE NUMBER OF PRINTED SHEETS(SHEETS/DAY) | 85 |

FIG. 4B — PRINT HISTORY INFORMATION MANAGED BY 2nd MFP

⟨2nd MFP⟩

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 2 | 100 | 98 |
| 2 | FAX | 8 | 100 | 90 |
| 3 | Copy | 40 | 100 | 50 |
| NUMBER OF TIMES TO REACH MAXIMUM | | 3 | AVERAGE NUMBER OF PRINTED SHEETS(SHEETS/DAY) | 45 |

FIG. 4C — PRINT HISTORY INFORMATION MANAGED BY 3rd MFP

⟨3rd MFP⟩

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 5 | 100 | 95 |
| 2 | Copy | 30 | 100 | 65 |
| 3 | Copy | 25 | 100 | 40 |
| 4 | PC-Print | 30 | 100 | 10 |
| 5 | Copy | 5 | 100 | 5 |
| NUMBER OF TIMES TO REACH MAXIMUM | | 2 | AVERAGE NUMBER OF PRINTED SHEETS(SHEETS/DAY) | 100 |

⟨3rd MFP⟩

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 5 | 100 | 95 |
| 2 | Copy | 30 | 100 | 65 |
| 3 | Copy | 25 | 100 | 40 |
| 4 | PC-Print | 30 | 100 | 10 |
| 5 | Copy | 5 | 100 | 5 |
| 6 | Transfer | 0 | 105 | 10 |
| 7 | FAX | 10 | 105 | 0 |
| NUMBER OF TIMES TO REACH MAXIMUM | | 3 | AVERAGE NUMBER OF PRINTED SHEETS(SHEETS/DAY) | 100 |

FIG. 4D — PRINT HISTORY INFORMATION MANAGED BY 4th MFP

⟨4th MFP⟩

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 1 | 100 | 99 |
| 2 | Copy | 7 | 100 | 92 |
| 3 | Copy | 15 | 100 | 77 |
| 4 | PC-Print | 7 | 100 | 70 |
| NUMBER OF TIMES TO REACH MAXIMUM | | 1 | AVERAGE NUMBER OF PRINTED SHEETS(SHEETS/DAY) | 40 |

⟨4th MFP⟩

| No. | PRINT TYPE | NUMBER OF PRINTED SHEETS | MAXIMUM NUMBER OF PRINTABLE SHEETS | REMAINING NUMBER OF PRINTABLE SHEETS |
|---|---|---|---|---|
| 1 | PC-Print | 1 | 100 | 99 |
| 2 | Copy | 7 | 100 | 92 |
| 3 | Copy | 15 | 100 | 77 |
| 4 | PC-Print | 7 | 100 | 70 |
| 5 | Transfer | 0 | 95 | 65 |
| NUMBER OF TIMES TO REACH MAXIMUM | | 1 | AVERAGE NUMBER OF PRINTED SHEETS(SHEETS/DAY) | 40 |

TRANSFER OF PART OF MAXIMUM NUMBER OF PRINTABLE SHEETS

FIG. 5  PRINT HISTORY INFORMATION FOR EACH MFP THAT IS MANAGED BY SERVER

| No. | DEVICE NAME | NUMBER OF PRINTED SHEETS | MAXIMUM NUMBER OF PRINTABLE SHEETS | REMAINING NUMBER OF PRINTABLE SHEETS |
|---|---|---|---|---|
| 1 | 1st MFP | 85 | 100 | 15 |
| 2 | 2nd MFP | 50 | 100 | 50 |
| 3 | 3rd MFP | 95 | 100 | 5 |
| 4 | 4th MFP | 30 | 100 | 70 |

⇩ AFTER TRANSFERRING

| No. | DEVICE NAME | NUMBER OF PRINTED SHEETS | MAXIMUM NUMBER OF PRINTABLE SHEETS | REMAINING NUMBER OF PRINTABLE SHEETS |
|---|---|---|---|---|
| 1 | 1st MFP | 85 | 100 | 15 |
| 2 | 2nd MFP | 50 | 100 | 50 |
| 3 | 3rd MFP | 95 | 105 | 10 |
| 4 | 4th MFP | 30 | 95 | 65 |

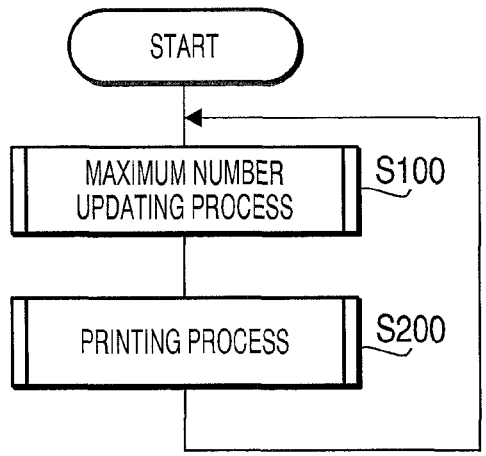

FIG. 6

PRINTING SYSTEM AND SERVER THEREFOR

CROSS-REFERENCE TO RELATED APPLICATION

This application claims priority under 35 U.S.C. §119 from Japanese Patent Application No. 2008-287805 filed on Nov. 10, 2008. The entire subject matter of the application is incorporated herein by reference.

BACKGROUND

1. Technical Field

The following description relates to one or more printing system that includes a server and a plurality of printing devices interconnected via a network.

2. Related Art

So far, the following printing system has been known as an example of printing systems configured with a plurality of printing devices, interconnected via a network, for each of which a predetermined maximum number (an upper limit number) of printable sheets is set. In the printing system, when the number of sheets to be printed by a printing device exceeds the maximum number of printable sheets therefor, the printing device requests a different printing device to transfer at least part of the maximum number of printable sheets for the different printing device to the printing device.

Further, the following printing system has been known which is configured with a server and a plurality of printing devices interconnected via a network. In the printing system, when the number of sheets to be printed by a printing device exceeds the maximum number of printable sheets therefor, the printing device issues to the server a request for making-up of the shortfall (i.e., the excess). In the system, in response to receipt of the making-up request, the server requests a printing device having a remaining number of printable sheets more than those of any other printing devices to return at least part of the remaining number that corresponds to the shortfall to be filled. Then, the server assigns the returned number of printable sheets to the printing device that has issued the making-up request, so as to meet the making-up request.

SUMMARY

However, in the aforementioned technique, when a shortfall in a remaining number of printable sheets of a printing device is covered by another printing device, the server determines a device as a transfer source to make up for the shortfall, merely by checking statuses of other devices at that moment. Therefore, the determination is not necessarily made in an appropriate manner.

For example, when a frequently-used printing device is determined as a transfer source to make up for the shortfall just for a reason that the printing device happens to have the most remaining number of printable sheets, the number of sheets to be printed by the printing device might reach or exceed the maximum number of printable sheets therefor shortly after that. In such a situation, the printing device has to request a different device to cede at least part of the remaining number of printable sheets for the different device. Consequently, it might cause a problem that a user of each printing device in the system feels frustrated because at least part of the maximum number of printable sheets is repeatedly transferred from one device to another.

Aspects of the present invention are advantageous to provide one or more improved printing systems adapted such that when the number of sheets to be printed by a printing device exceeds the maximum number of printable sheets therefor, the printing device can have a certain number of printable sheets corresponding to the shortfall transferred from one or more other devices selected appropriately.

According to aspects of the present invention, a printing system is provided, which includes a server and a plurality of printing devices connected with the server via a network. Each of the plurality of printing devices includes a setting unit configured to set a maximum number of printable sheets up to which the printing device is permitted to perform a printing operation, a printer unit configured to, in response to acceptance of a print request, perform a printing operation as far as a cumulative number of sheets that have ever been printed is within the maximum number of printable sheets set by the setting unit, a first determining unit configured to, upon receipt of the print request, determine whether a remaining number of printable sheets is less than a total number of sheets to be printed based on the print request, the remaining number of printable sheets being defined by subtracting the cumulative number of sheets that have ever been printed from the maximum number of printable sheets, a transfer requesting unit configured to issue a transfer request to the server when the first determining unit determines that the remaining number of printable sheets is less than the total number of sheets to be printed based on the print request, and an update unit configured to, in response to a transfer instruction received from the server, update the maximum number of printable sheets set by the setting unit. The server includes a transfer source selecting unit configured to, in response to the transfer request issued by the transfer requesting unit of a first printing device, select from the printing devices other than the first printing device, a second printing device that cedes at least part of the maximum number of printable sheets set for the second printing device, based on respective frequencies of printing operations performed by the printing devices other than the first printing device, and a transfer instructing unit configured to issue the transfer instruction to each of the first printing device and the second printing device, the transfer instruction causing the first printing device to increase the maximum number of printable sheets for the first printing device and causing the second printing device to decrease the maximum number of printable sheets for the second printing device.

According to aspects of the present invention, further provided is a server communicable with a plurality of printing devices via a network. Each of the plurality of printing devices has a maximum number of printable sheets set therefor up to which the printing device is permitted to perform a printing operation. The server includes a transfer source selecting unit configured to, in response to a transfer request received from a first printing device of the plurality of printing devices, select from the printing devices other than the first printing device, a second printing device that cedes at least part of the maximum number of printable sheets for the second printing device, based on respective frequencies of printing operations performed by the printing devices other than the first printing device, and a transfer instructing unit configured to issue a transfer instruction to each of the first printing device and the second printing device, the transfer instruction causing the first printing device to increase the maximum number of printable sheets for the first printing device and causing the second printing device to decrease the maximum number of printable sheets for the second printing device.

BRIEF DESCRIPTION OF THE ACCOMPANYING DRAWINGS

FIG. 3 exemplifies print history information for each MFP that is managed by the server in the first embodiment according to one or more aspects of the present invention.

FIGS. 4A to 4D show respective examples of print history information managed by the MFPs in the first embodiment according to one or more aspects of the present invention.

FIG. 5 exemplifies changes, between before and after the transfer of part of the maximum number of printable sheets, in the print history information for the MFPs that is managed by the server in the first embodiment according to one or more aspects of the present invention.

FIG. 6 is a flowchart showing a print control process to be executed by each MFP in the first embodiment according to one or more aspects of the present invention.

Figure 7:
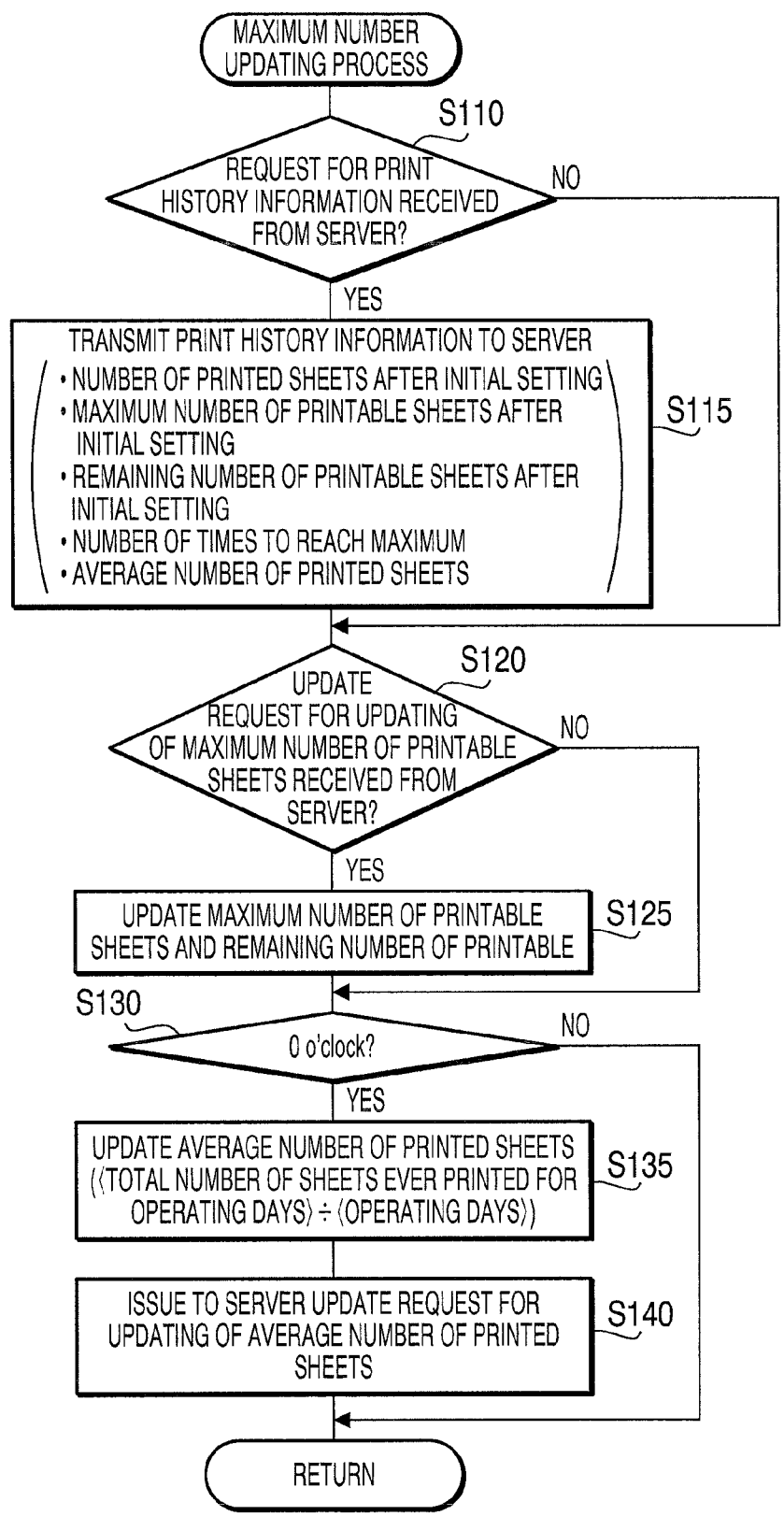

FIG. 7 is a flowchart showing a detailed procedure of a maximum number updating process in the print control process in the first embodiment according to one or more aspects of the present invention.

Figure 8:
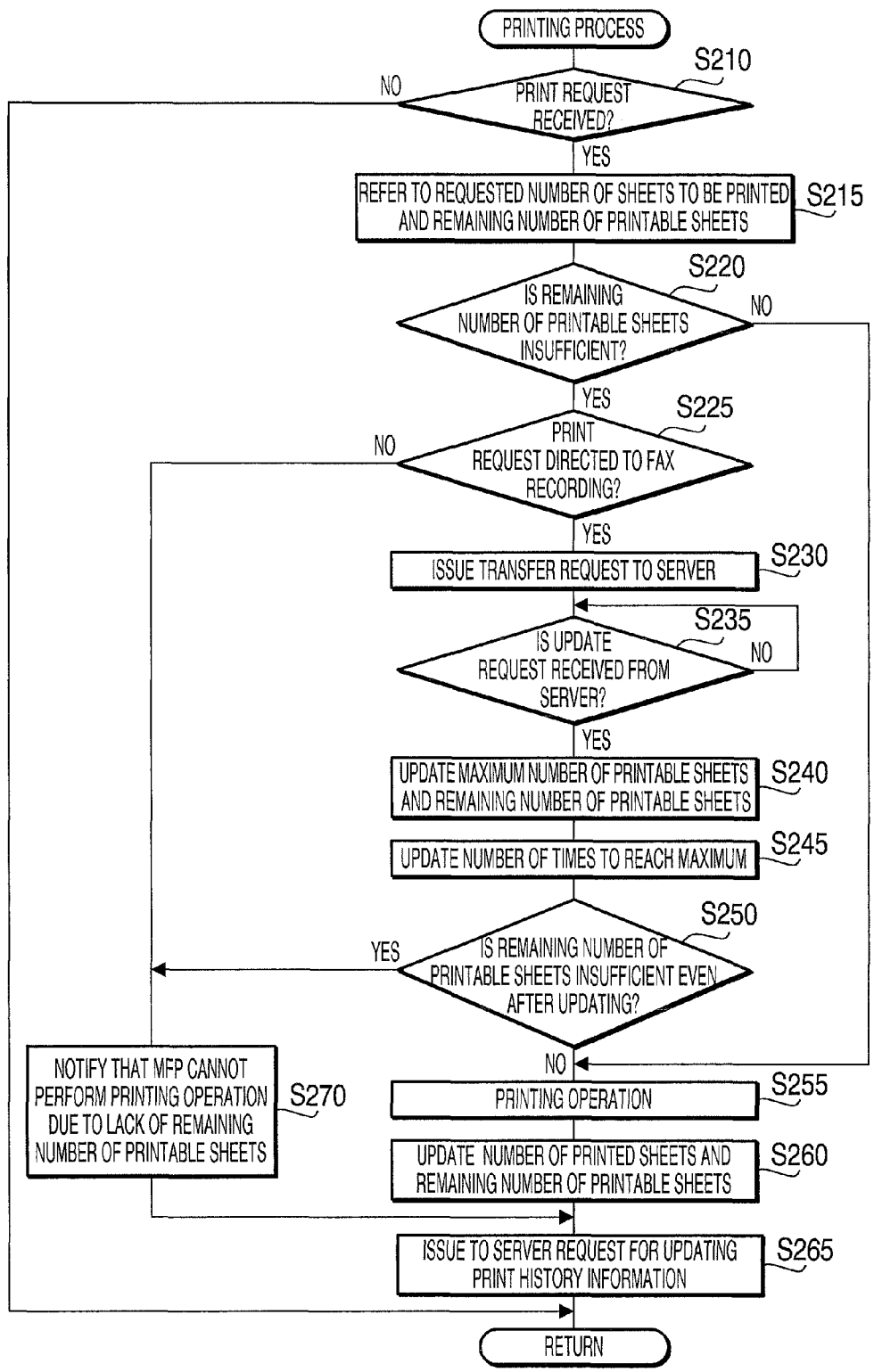

FIG. 8 is a flowchart showing a detailed procedure of a printing process in the print control process in the first embodiment according to one or more aspects of the present invention.

Figure 9:
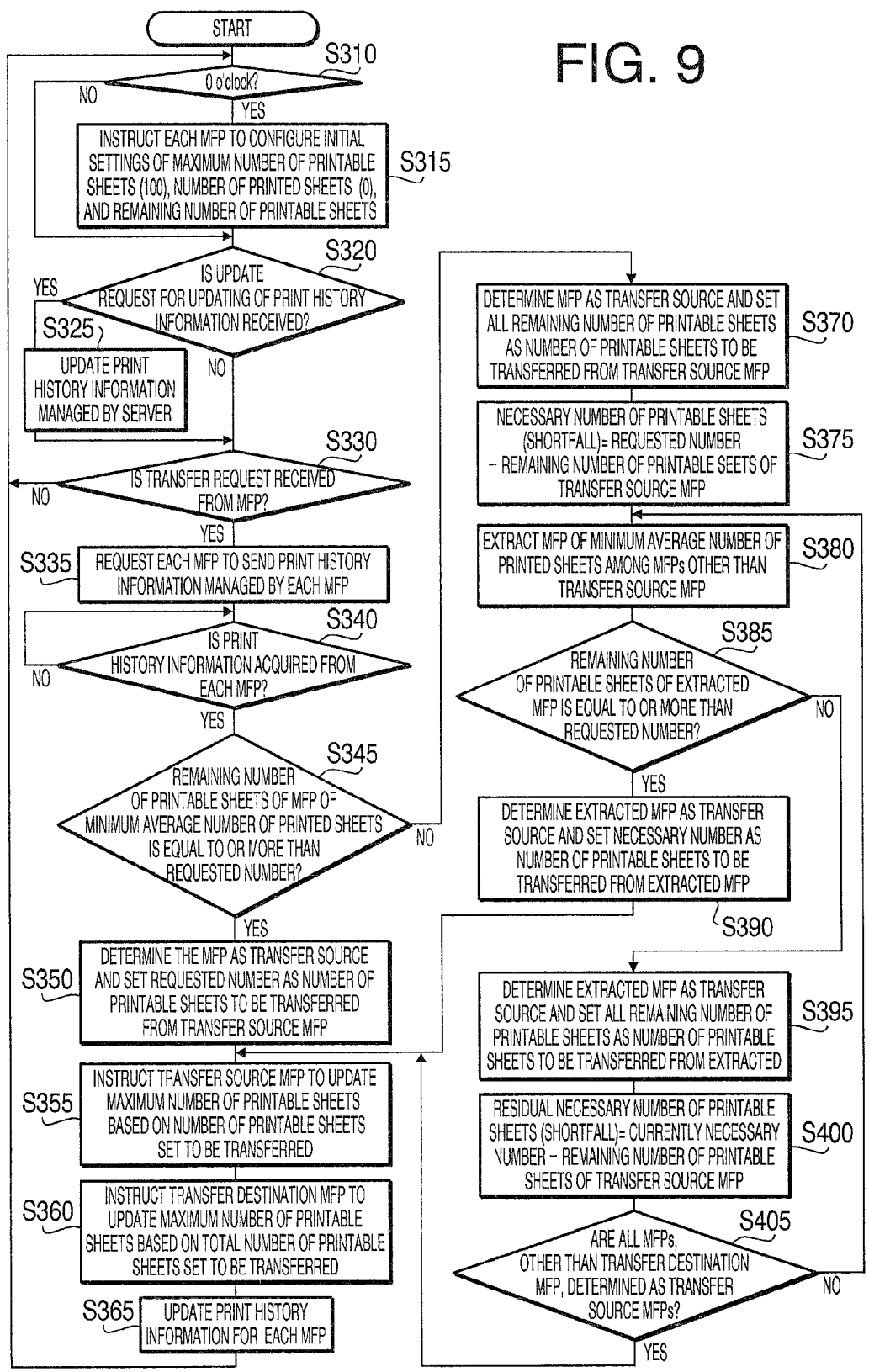

FIG. 9 is a flowchart showing an MFP management process to be executed by the server in the first embodiment according to one or more aspects of the present invention.

FIGS. 10A and 10B shows respective examples of print history information for the same user that is managed by a first MFP and a second MFP in a second embodiment according to one or more aspects of the present invention.

Figure 11:
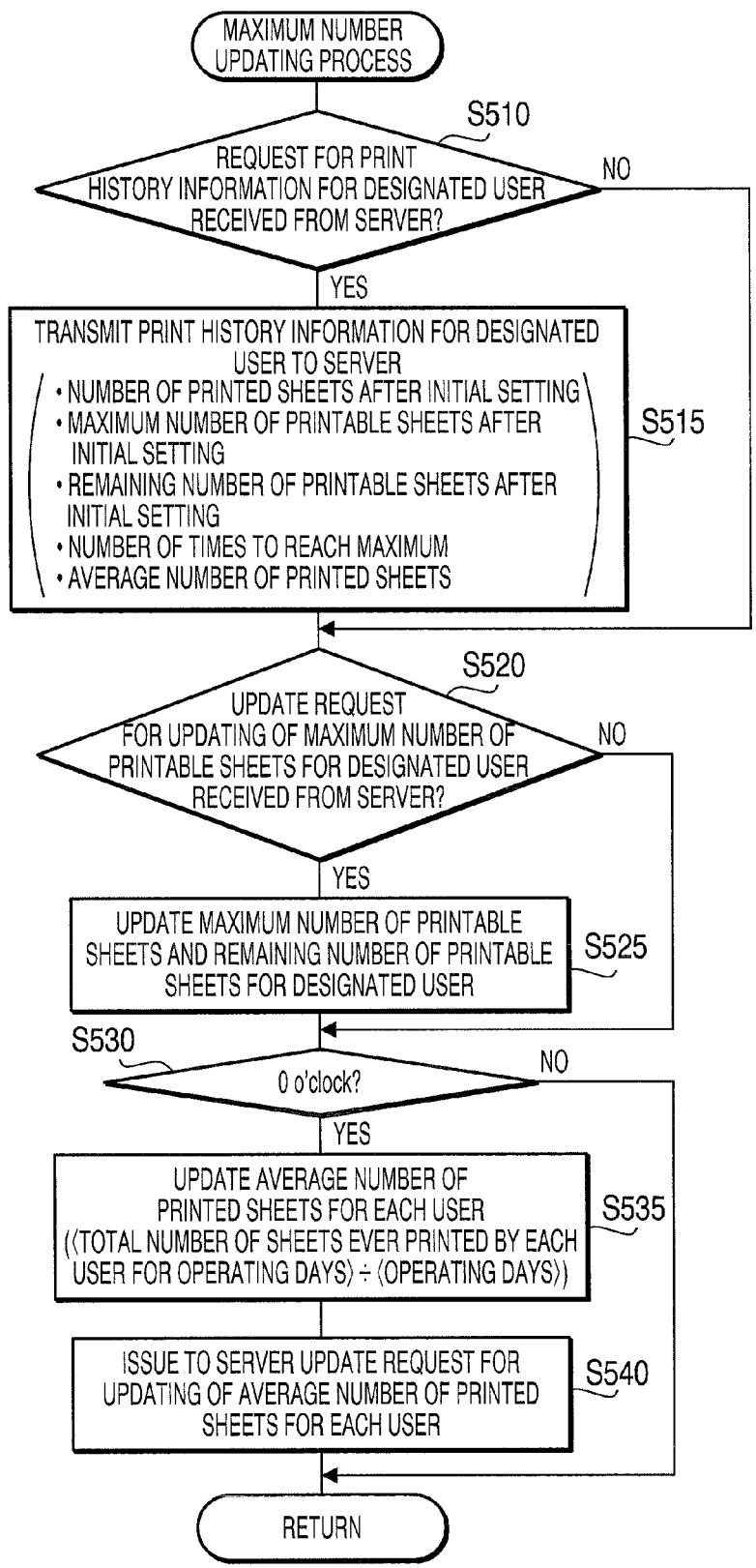

FIG. 11 is a flowchart showing a maximum number updating process to be executed by each MFP in the second embodiment according to one or more aspects of the present invention.

Figure 12:
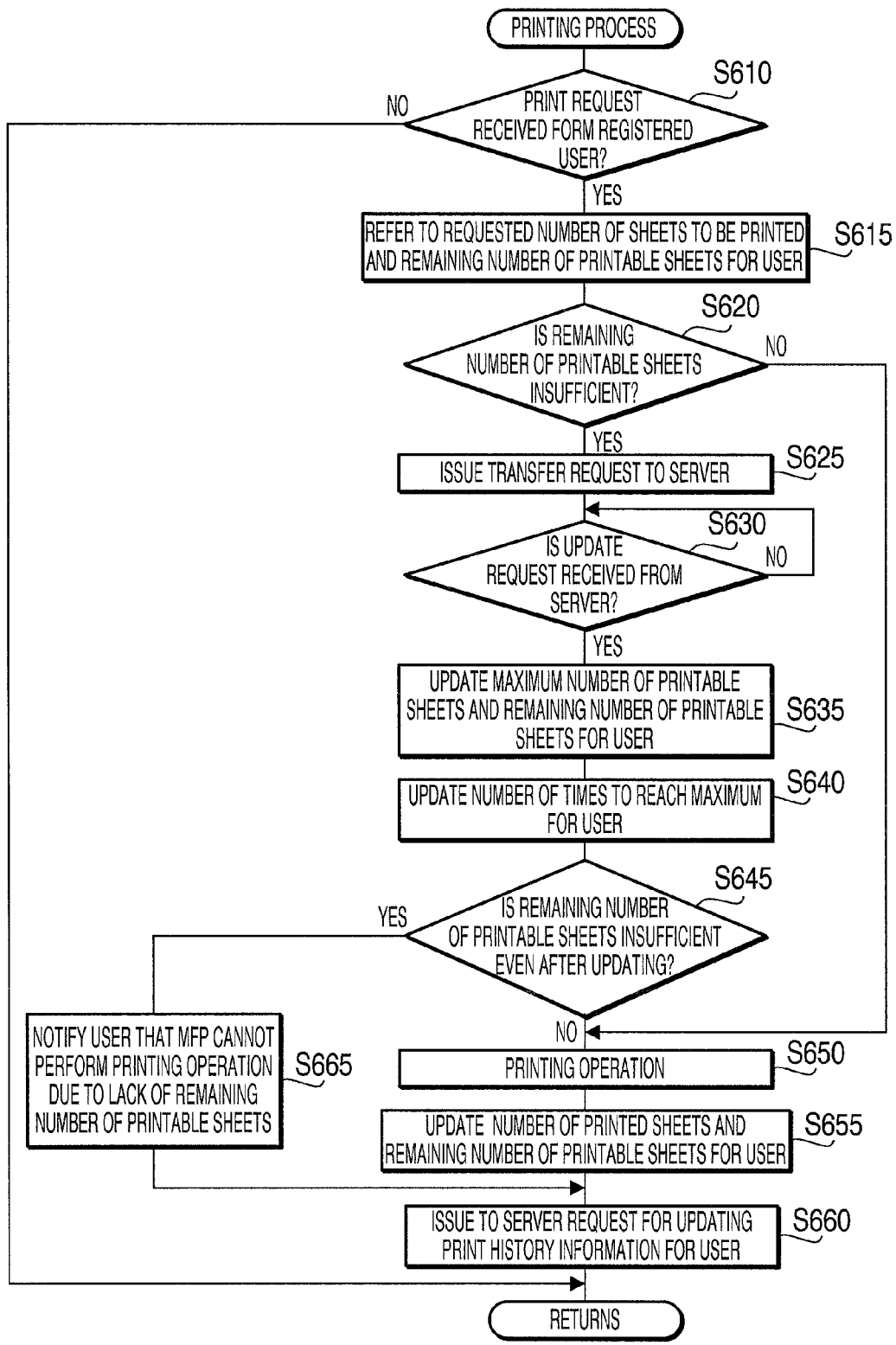

FIG. 12 is a flowchart showing a printing process to be executed by each MFP in the second embodiment according to one or more aspects of the present invention.

Figure 13:
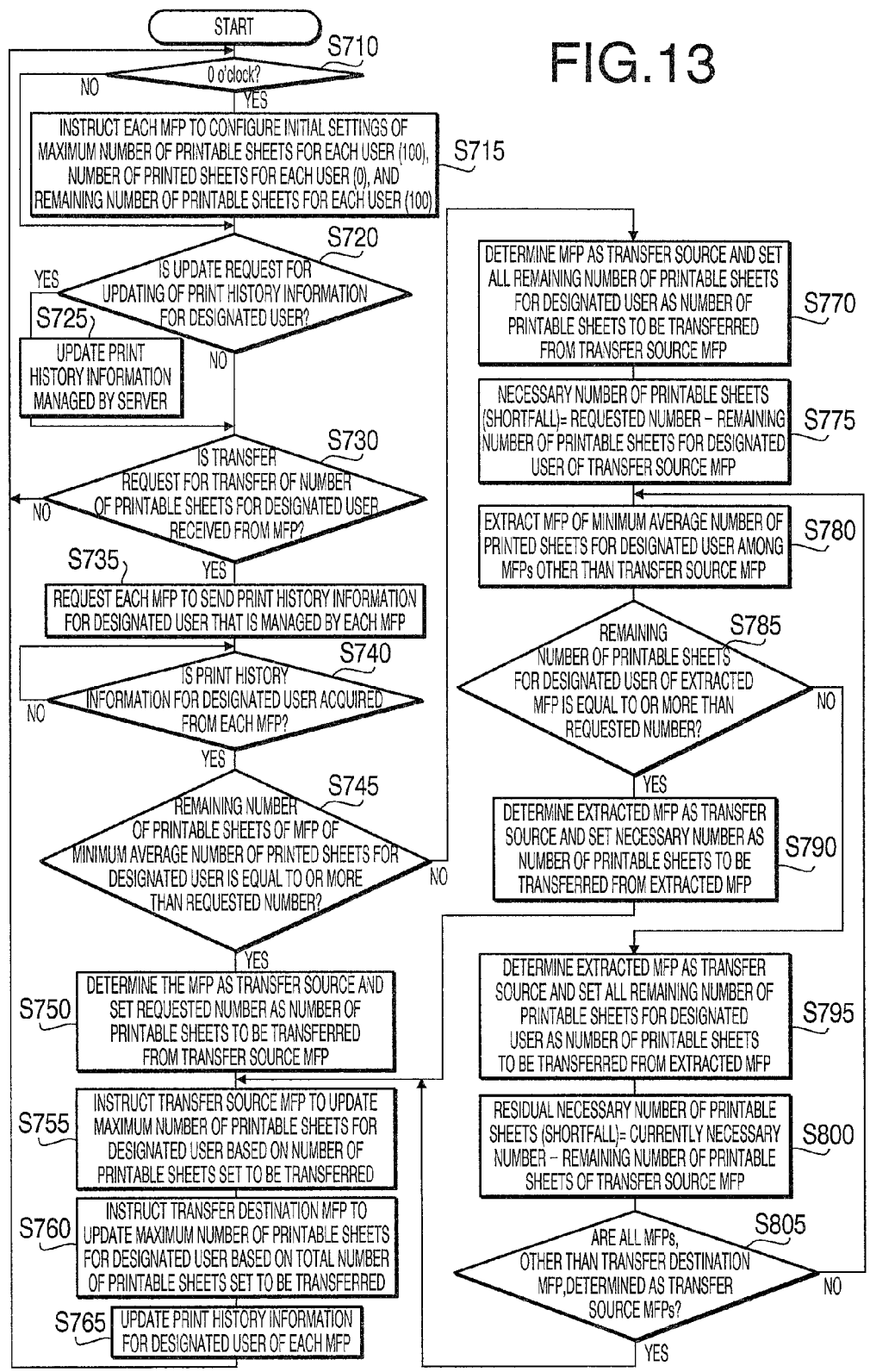

FIG. 13 is a flowchart showing an MFP management process to be executed by a server in the second embodiment according to one or more aspects of the present invention.

Figure 14:
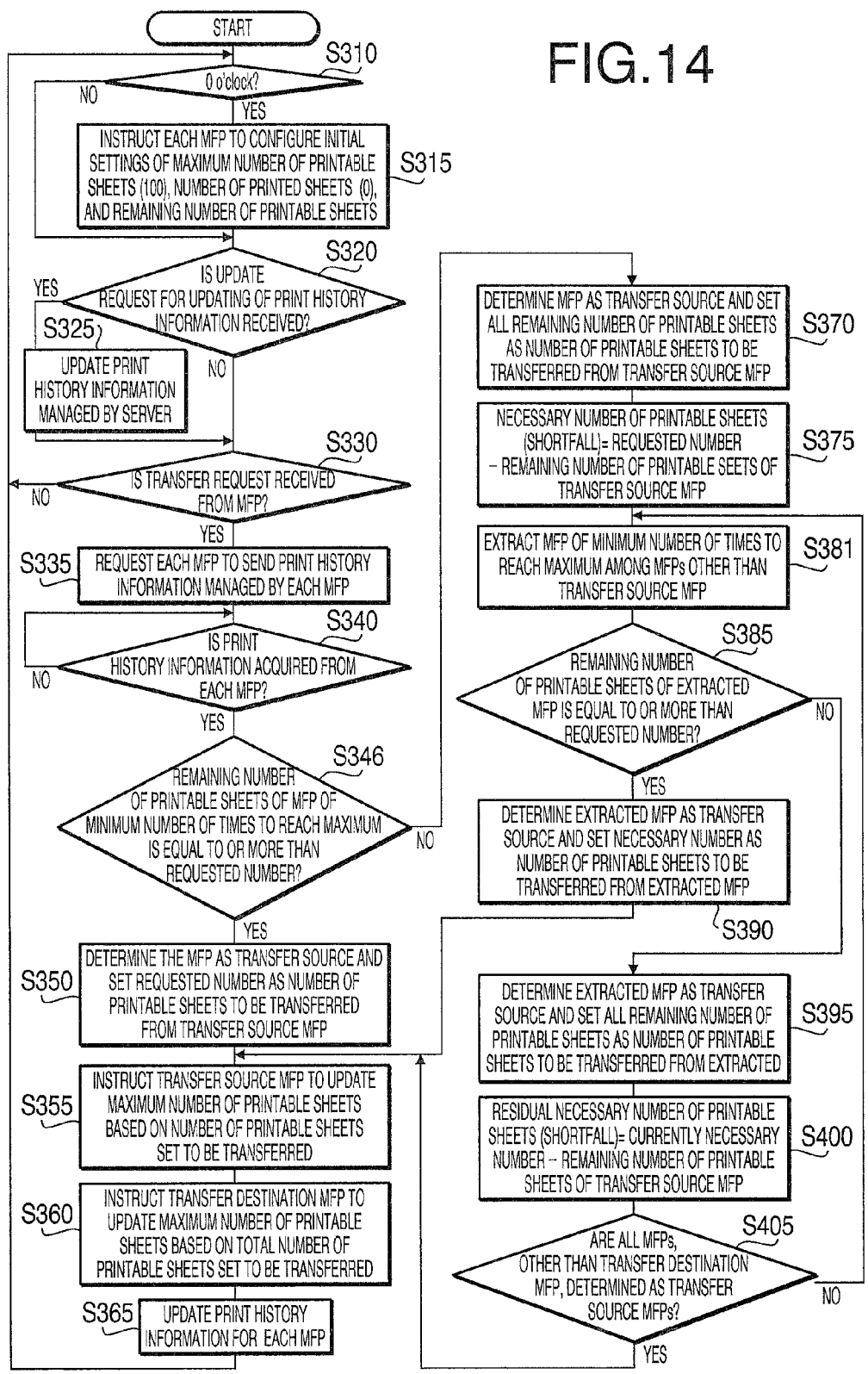

FIG. 14 is a flowchart showing an MFP management process to be executed by the server in a modification according to one or more aspects of the present invention.

Figure 15:
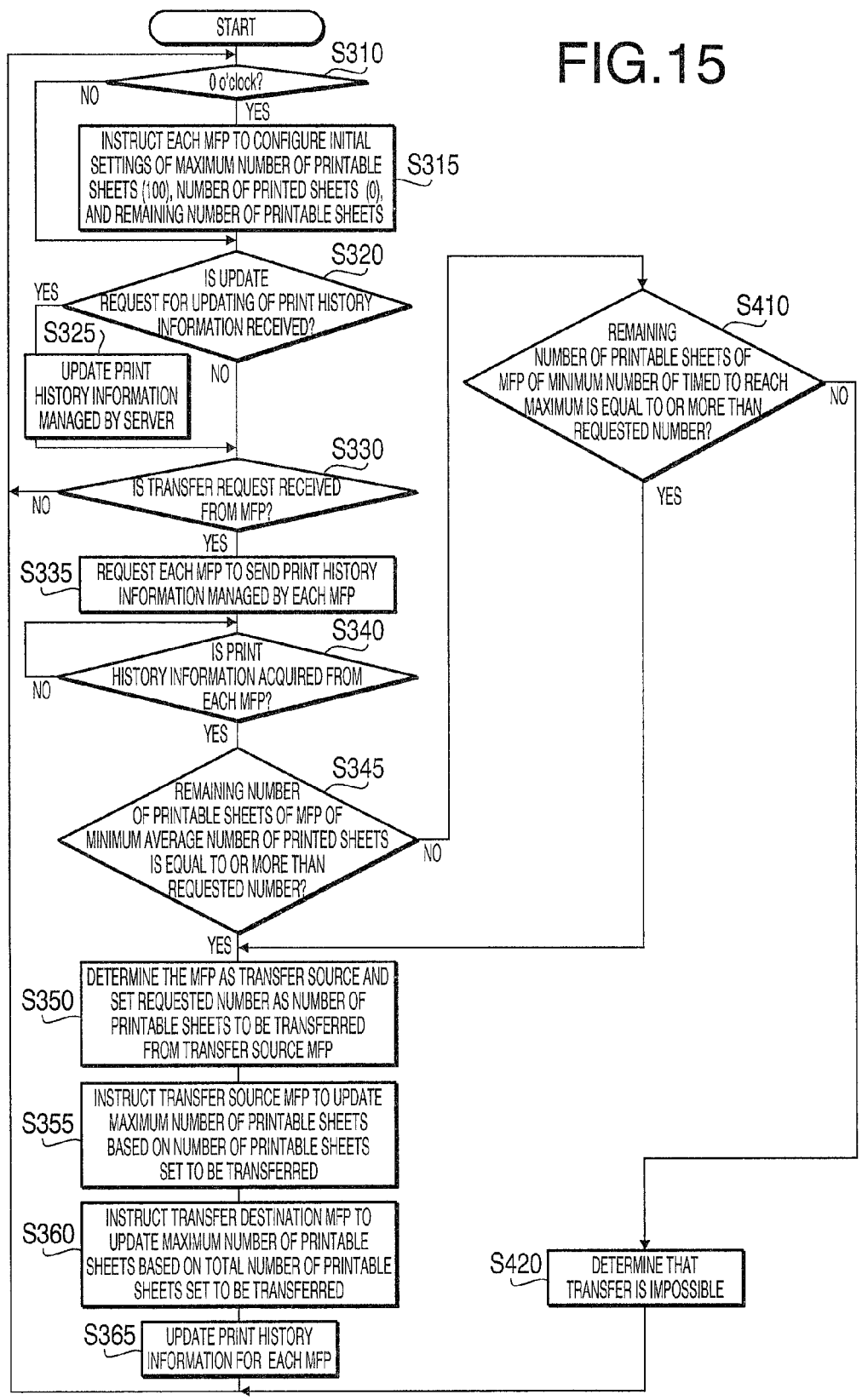

FIG. 15 is a flowchart showing an MFP management process to be executed by the server in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompanying drawings.

[First Embodiment]

(1) Overall Configuration of Printing System

Figure 1:
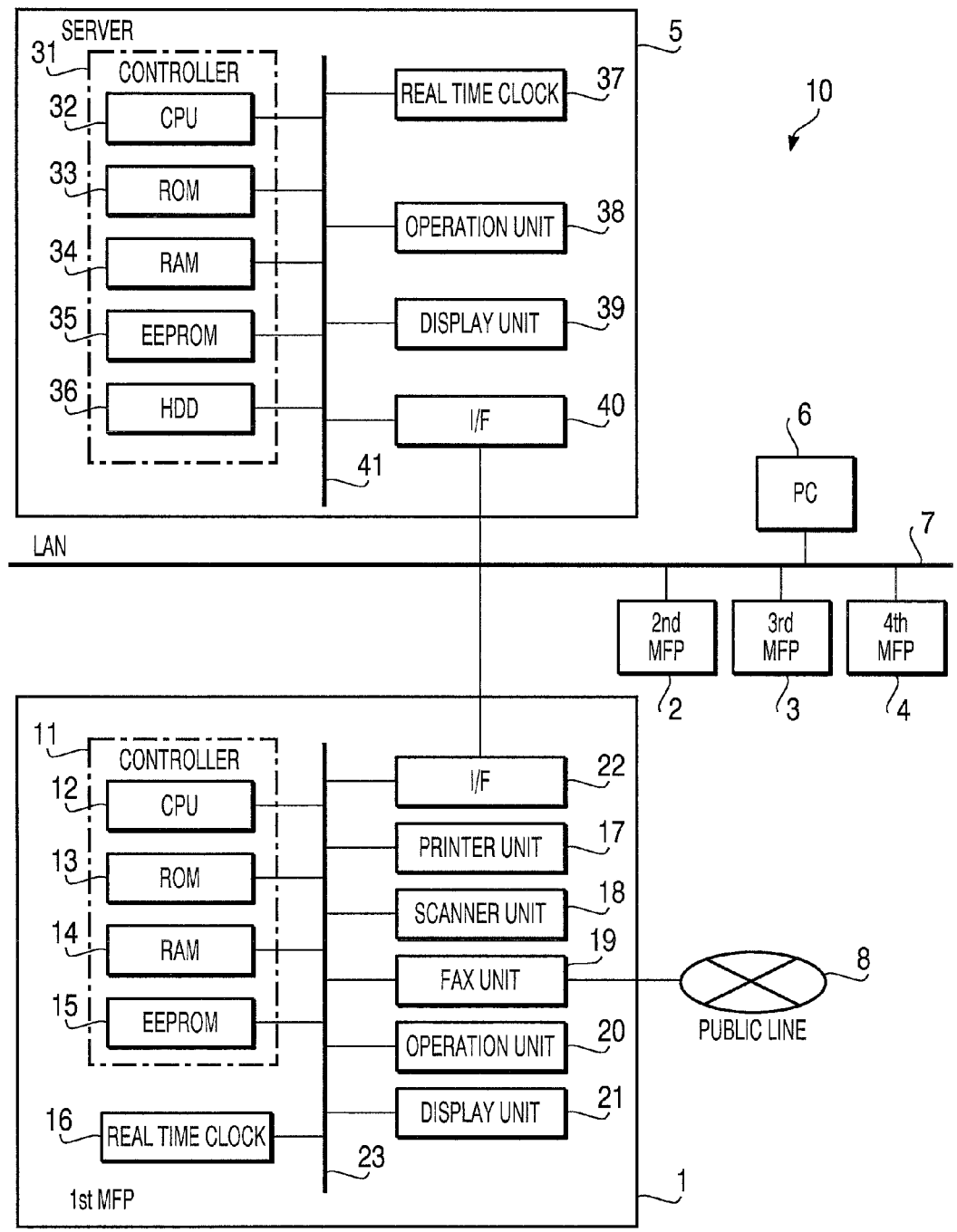
FIG. 1 is a block diagram schematically showing an overall configuration of a printing system in a first embodiment according to one or more aspects of the present invention.

As illustrated in FIG. 1, a printing system 10 of a first embodiment includes a server 5, a first Multi-Function Peripheral (MFP) 1, a second MFP 2, a third MFP, a fourth MFP, and a Personal Computer (PC) 6, which are interconnected via a Local Area Network (LAN) 7 in a mutually communicable manner.

At first, a configuration of each of the MFPs 1 to 4 will be described. In the first embodiment, the MFPs 1 to 4 have the same configuration. Therefore, explanation will be provided here about the configuration of the first MFP 1 as a typical example, but not about the configurations of the other MFP 2 to 4.

The first MFP 1 has various functions such as a scanner function, a printer function, a facsimile function, and a network communication function. The first MFP 1 is provided with a controller 11, a clock 16, a printer unit 17, a scanner unit 18, a facsimile unit 19, an operation unit 20, a display unit 21, and an interface (I/F) 22, which are connected via a bus 23.

The controller 11 is configured with a microcomputer that includes a CPU 12, a ROM 13, a RAM 14, an EEPROM 15. The controller 11 controls elements included in the first MFP 1 such as the printer unit 17, the scanner unit 18, the facsimile unit 19, the display unit 21, and the I/F 22 based on various control programs stored on the ROM 13.

The clock 16 is a known real time clock which is generally provided to a commonly-used computer system. The clock 16 is configured to provide a current time to the controller 11.

The printer unit 17 perform a printing operation in accordance with a print command from the controller 11.

In the first MFP 1 of the first embodiment, when a print request is received from the PC 6, when a print request for printing of an image scanned by the scanner unit 18 is input by a user, or when a print request for printing of facsimile data received by the facsimile unit 19 is issued by the facsimile unit 19, the controller 11 issues to the printer unit 17 a command to perform a printing operation. In response to receipt of the command from the controller 11, the printer unit 17 performs printing on a sheet based on the command.

However, in this respect, in the first MFP 1 of the first embodiment, a printing operation is performed not unconditionally but with the number of sheets printable each day being restricted, e.g., to 100 sheets. Thus, when the cumulative number of sheets printed reaches "100" which has been set as the maximum number of sheets printable, no more printing operation is performed as a general rule.

However, the first MFP 1 is configured such that when the cumulative number of sheets to be printed exceeds "100," the controller 11 has at least part of the maximum number of printable sheets that corresponds to the excess over "100" (i.e., the shortfall) transferred from one or more of the other MFPs 2 to 4. It is noted that in the first embodiment, the transfer of at least part of the maximum number of printable sheets between MFPs is achieved just for printing of facsimile data. The transfer of at least part of the maximum number of printable sheets between MFPs will be described in detail below.

An execution history of printing operations performed by the printer unit 17 (print history information: see FIG. 4) is stored on the EEPROM 15. The controller 11 refers to the print history information stored on the EEPROM 15 when issuing a print command to the printer unit 17. Then the controller 11 determines whether the number of sheets printable is equal to or more than the number of sheets to be printed. When determining that the number of sheets printable is equal to or more than the number of sheets to be printed, the controller 11 causes the printer unit 17 to advance a printing operation based on the print command. Meanwhile, when determining that the number of sheets printable is less than the number of sheets to be printed (and data to be printed is facsimile data), the controller 11 performs a predetermined process to make one or more of the other MFPs 2 to 4 provide the first MFP 1 with the number of printable sheets corresponding to the excess.

The scanner unit 18 is provided with an image sensor capable of optically scanning an image on a document. The image scanned by the scanner unit 18 is processed mainly by the controller 11 in an appropriate manner.

The facsimile unit 19 performs facsimile data communication with the outside via an external public line 8.

The operation unit 20 is provided with various user-operable switches. Through the various switches of the operation unit 20, a user can perform various operations such as configuring settings for the first MFP 1 and issuing processing requests to the first MFP 1.

The display unit 21 is provided, e.g., with a liquid crystal display (LCD) or an LED, on which various kinds of information such as an operational status of the first MFP 1 are displayed.

The I/F 22 is a known interface device with which the first MFP 1 performs mutual data communication with the server 5 or the PC 6 via the LAN 7.

Subsequently, a configuration of the server 5 will be set forth. The server 5 has a function to individually manage the MFPs 1 to 4. Further, as will be mentioned below, in response to receipt of a request for transfer of the number of printable sheets from an MFP, the server 5 has a function to achieve various operations corresponding to the request. The server 5 of the first embodiment includes a controller 31, a clock 37, an operation unit 38, a display unit 39, an I/F 40, which are interconnected via a bus 41.

The controller 31 is configured with a Hard Disk Drive (HDD) 36 and a microcomputer that includes a CPU 32, a ROM 33, a RAM 34, an EEPROM 35. Based on various control programs stored on the HDD 36 or the ROM 13, the controller 31 performs various processes such as a process for transferring at least part of the maximum number of printable sheets between MFPs.

The operation unit 38 is provided, e.g., with a keyboard and/or a mouse. The display unit 39 is configured, e.g., with an LCD. The I/F 40 is a known interface device with which the server 5 performs mutual data communication with the MFPs 1 to 4 and the PC 6 via the LAN 7.

In addition, the PC 6 has a general configuration in which the PC 6 includes a CPU, a ROM, a RAM, an HDD, a keyboard, a mouse, and a display though they are not shown in any drawing. The PC 6 has an operating system and various kinds of application software installed on the HDD thereof. Therefore, a user of the PC 6 can transmit an image created and edited using the application software to an intended one of the MFPs 1 to 4, and cause the intended MFP to print the image on a sheet.

(2) Transfer of Number of Printable Sheets between MFPs via Server

Figure 2:
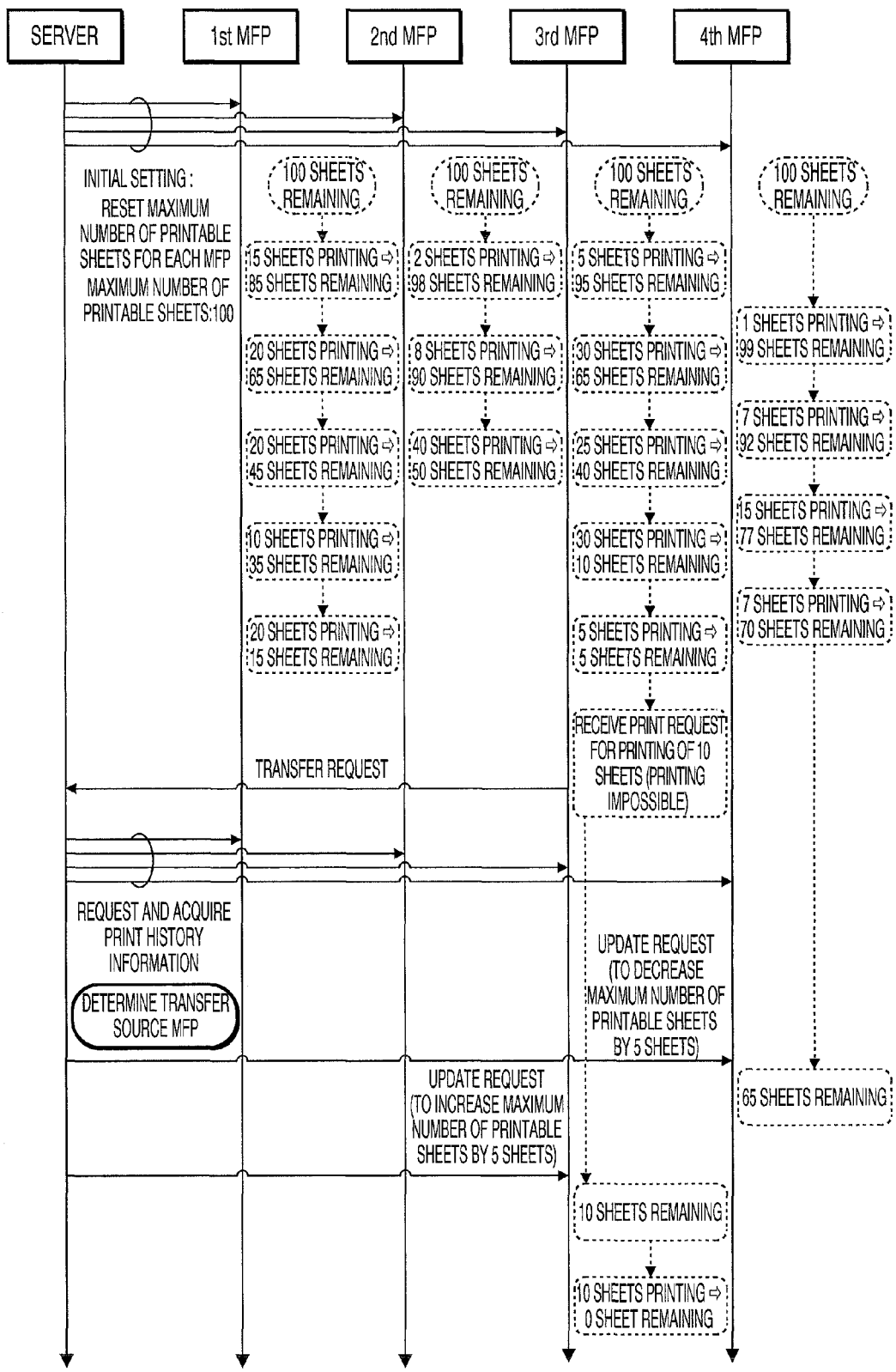
FIG. 2 is a sequence diagram illustrating transfer of part of a maximum number of printable sheets between Multi-Function Peripherals (MFPs) via a server, which is achieved in the printing system, in the first embodiment according to one or more aspects of the present invention.

Next, explanation will be provided referring to the sequence diagram in FIG. 2 to set forth basic operations of the server 5 and the MFPs 1 to 4, especially, to set forth the transfer of the number of printable sheets between the MFPs 1 to 4 via the server 5. As illustrated in FIG. 2, the server 5 configures an initial setting of the maximum number of printable sheets for each of the MFPs 1 to 4 at intervals of a predetermined time period (in the first embodiment, every 0 a.m.). Specifically, the server 5 requests the MFPs 1 to 4 to reset the maximum number of printable sheets to "100." Concurrently, the server 5 requests the MFPs 1 to 4 to reset the number of printed sheets and the remaining number of printable sheets to "0" and "100," respectively. It is noted that the number of printed sheets represents the cumulative number of sheets actually printed after the resetting operations.

Additionally, the server 5 has print history information of each of the MFPs 1 to 4 stored on the EEPROM 35 thereof. Based on the print history information, the server 5 manages each of the MFPs 1 to 4.

As shown in FIG. 3, the print history information, which the server 5 manages, includes the following numbers for each of the MFPs 1 to 4: the number of sheets printed until the current time after the initial setting (i.e., the cumulative number of printed sheets), the maximum number of printable sheets, the remaining number of printable sheets that represents how many printable sheets remain to the maximum number of printable sheets, the number of times that the number of printed sheets has ever reached the maximum number of printable sheets (hereinafter referred to as "the number of times to reach the maximum," and the average number of sheet printed each day.

FIG. 3 exemplifies a state where any MFP has not yet performed printing after the maximum number of printable sheets was set to the initial value "100," and the remaining number of printable sheets is still "100." It is noted that the maximum number of printable sheets can be changed by an administrator of the server 5 as needed.

On the other hand, the MFPs 1 to 4 manage their respective print history information. Specifically, as exemplified in FIGS. 4A to 4D, each of the MFPs 1 to 4 has the print history information stored on the EEPROM 15 thereof.

As illustrated in FIGS. 4A to 4D, each of the MFPs 1 to 4 stores and manages the number of printed sheets, the maximum number of printable sheets, the remaining number of printable sheets, the number of times to reach the maximum, and the average number of printed sheets. Every time a printing operation is performed, the controller 11 sequentially stores the history of the printing operation along with the kind of the printing operation (print type).

Among the print types shown in FIGS. 4A to 4D, the "PC-Print" denotes a printing operation performed based on a print request from the PC 6. In addition, the "Copy" denotes a printing operation performed based on a print request for printing of an image scanned by the scanner unit 18. Furthermore, the "FAX" denotes a printing operation performed based on a print request for printing of facsimile data received by the facsimile unit 19 (hereinafter, sometimes referred to as "FAX recording").

Referring back to FIG. 2, when the initial settings are configured by the server 5 in the aforementioned manner, the controller 11 of each of the MFPs 1 to 4 updates the print history information thereof in response to an initial setting request from the server 5. Therefore, just after the initial settings, the remaining number of printable sheets is set to "100" in each of the MFPs 1 to 4. After that, each time a printing operation is performed, the remaining number of printable sheets decreases by the number of sheets which are actually printed in the printing operation.

For example, in the first MFP 1, in the first printing operation after the initial settings, printing of 15 sheets (PC-Print, see FIG. 4A) is performed and thereby the remaining number of printable sheets becomes "85." In the second printing operation, printing of 20 sheets (Copy, see FIG. 4A) is performed and thereby the remaining number of printable sheets becomes "65." In the third printing operation, printing of 20 sheets (Copy, see FIG. 4A) is performed and thereby the remaining number of printable sheets becomes "45." In the fourth printing operation, printing of 10 sheets (FAX, see FIG. 4A) is performed and thereby the remaining number of printable sheets becomes "35." In the fifth printing operation, printing of 20 sheets (Copy, see FIG. 4A) is performed and thereby the remaining number of printable sheets becomes "15."

In the same manner, in each of the other MFPs 2 to 4, as shown in FIGS. 2 and 4B to 4D, every time a printing operation is performed, the remaining number of printable sheets are reduced. Further, as illustrated in FIGS. 4A to 4D, each time a printing operation is performed, the history of the printing operation executed is stored as print history information along with the print type. Thus, the number of printed sheets and the remaining number of printable sheets in the print history information are updated every printing operation.

In the meantime, as shown in FIG. 2, the third MFP 3 is placed after the fifth printing operation into a state where the remaining number of printable sheets decreases to "5," and five printable sheets are just left according to a general rule. However, in the first embodiment, in the case of the FAX recording as a print type, even though the remaining number of printable sheets is insufficient, the third MFP 3 can be provided with the number of printable sheets, corresponding to the excess over the maximum, which is transferred from one or more other MFPs via the server 5, so that the third MFP 3 can perform the FAX recording.

Specifically, as illustrated in FIG. 2, when a print request for the sixth printing operation of printing 10 sheets (FAX recording, see FIG. 4C) is issued to the third MFP 3, the sixth printing operation cannot be performed since the remaining number of printable sheets "5" is insufficient. In such a situation, after confirming that the print request is intended to the FAX recording, the third MFP 3 sends to the server 5 a transfer request, which requests one or more other MFPs to transfer at least part of their maximum number of printable sheets corresponding to the shortfall i.e., 5 sheets.

In response to receipt of the transfer request from the third MFP 3, the server 5 requests and acquires, from each of the MFPs 1 to 4, the current print history information managed by each MFP. Then, based on the print history information acquired from each MFP, the server 5 determines a transfer source MFP. Specifically, in the first embodiment, the server 5 determines as a transfer source MFP an MFP of the minimum average number of printed sheets among the MFPs 1, 2, and 4 other than the third MFP 3.

In the first embodiment, as illustrated in FIGS. 2 and 4A to 4D, the MFP which has the minimum average number of printed sheets is the fourth MFP 4. Further, the remaining number of printable sheets of the fourth MFP 4 is "70" at the present time, which is enough to secure 5 sheets requested by the transfer request. Thus, the server 5 determines the fourth MFP 4 as a transferor (transfer source).

After determining the fourth MFP 4 as a transfer source, the server 5 transfers at least part of the maximum number of printable sheets assigned to the fourth MFP 4 from the fourth MFP 4 as a transfer source to the third MFP 3 as a transfer destination (i.e., a transfer requestor). Specifically, the server 5 requests the fourth MFP 4 to change the maximum number of printable sheets thereof by the requested number (i.e., reduce the maximum number by 5 sheets), and requests the third MFP 3 to change the maximum number of printable sheets thereof by the requested number (i.e., increase the maximum number by 5 sheets). In other words, the server 5 issues, to the fourth MFP 4 and the third MFP 3, transfer instructions to reduce and increase the maximum numbers of printable sheets thereof, respectively.

Then, after issuing the above requests (transfer instructions) to the third MFP 3 as a transfer requestor and the fourth MFP 4 as a transfer source, the server 5 updates the print history information managed by itself as illustrated in FIG. 5. FIG. 5 shows a state where through the transfer, the maximum number of printable sheets and the remaining number of printable sheets of the third MFP 3 increase to 105 and 10, respectively, and the maximum number of printable sheets and the remaining number of printable sheets of the fourth MFP 4 decrease to 95 and 65, respectively.

According to the transfer instruction from the server 5, the fourth MFP 4 as a transfer source adds to the print history information managed by itself a history that the fourth MFP 4 has transferred 5 sheets of the maximum number of printable sheets thereof, as shown in FIG. 4D. Consequently, the maximum number of printable sheets and the remaining number of printable sheets of the fourth MFP 4 decrease to 95 sheets and 65 sheets, respectively.

Meanwhile, in response to the transfer instruction from the server 5, the third MFP 3 as a transfer requestor adds to the print history information managed by itself a history that the third MFP 3 has had 5 sheets transferred to the maximum number of printable sheets thereof, as shown in FIG. 4C. Consequently, the maximum number of printable sheets and the remaining number of printable sheets of the fourth MFP 4 increase to 105 sheets and 10 sheets, respectively.

In addition, the third MFP 3 increments the number of times to reach the maximum of the print history information by one, i.e., from "2 times" to "3 times," as shown in FIG. 4C. Namely, when due to lack of the remaining number of printable sheets, an MFP has the number of printable sheets corresponding to the shortfall transferred from another MFP, it means that the number of sheets printed by the MFP reaches the maximum number of printable sheets assigned thereto. Therefore, when an MFP performs a printing operation with the maximum number of printable sheets partially transferred from another MFP, the number of times to reach the maximum of the MFP is updated.

Thereby, the third MFP 3 comes into a state where the third MFP 3 can perform a printing operation for 10 sheets. Therefore, the controller 11 of the third MFP 3 executes FAX recording for 10 sheets. Then, the result of the FAX recording is stored on the EEPROM 15 as a new print history of the third MFP 3 (see FIG. 4C).

(3) Explanation of Various Control Processes by Printing System

Subsequently, various control processes to be executed by the printing system 10 in the first embodiment will concretely be described with reference to the flowcharts in FIGS. 6 to 9.

(3-1) Print Control Process by MFPs

Firstly, a print control process to be executed by each of the MFPs 1 to 4 will be set forth using FIGS. 6 to 8. In each of the MFPs 1 to 4, after being booted, the CPU 12 of the controller 11 reads out a program for the print control process stored on the ROM 13, and executes the print control process in accordance with the program.

After launching the print control process, the CPU 12 first executes a maximum number updating process (S100), as illustrated in detail in FIG. 7. Specifically, the CPU 12 determines whether a request for the print history information is received from the server 5 (S110). When determining that no request for the print history information is received from the server 5 (S110: No), the CPU 12 goes to S120. When determining that a request for the print history information is received from the server 5 (S110: Yes), the CPU 12 transmits the print history information to the server 5 (S115).

Specifically, the CPU 12 transmits to the server 5 the print history information, stored and managed on the EEPROM 15, which contains the cumulative number of sheets printed until the current time after the initial setting of the maximum number of printable sheets, the maximum number of printable sheets, the remaining number of printable sheets, the number of times to reach the maximum, and the average number of printed sheets (see FIGS. 4A to 4D.

Subsequently, the CPU 12 determines whether an update request for updating of the maximum number of printable sheets is received from the server 5 (S120). It is noted that the update request from the server 5 corresponds to a below-mentioned operation executed by the server 5 in S315 or S355 of FIG. 9. When the update request is not received from the server 5 (S120: No), the CPU 12 goes to S130. Meanwhile, when the update request is received from the server 5 (S120: Yes), the CPU 12 updates the print history information managed by itself (S125). Specifically, the CPU 12 updates the maximum number of printable sheets and the remaining number of printable sheets.

In S130, the CPU 12 determines, based on time information provided by the clock 16, whether the current time has been 0 o'clock (S130). When the current time has not yet been 0 o'clock (S130: No), the CPU 12 terminates the maximum number updating process. Meanwhile, when the current time has been 0 o'clock (S130: Yes), the CPU 12 updates the average number of printed sheets (S135). Specifically, the CPU 12 defines the number of days until the current time after the MFP operates for the first time as the number of operating days, and determines an average number of sheets printed each day in the past by dividing the total number of sheets printed in all printing operations performed for the operating days by the number of operating days. Then, the CPU 12 updates the average number of printed sheets in the print history information managed by itself with the newly determined average number of printed sheets.

After updating the average number of printed sheets, the CPU 12 requests the server 5 to update the average number of printed sheets for the MFP in the print history information managed by itself with the average number of printed sheets determined in S135.

Thus, when terminating the maximum number updating process in S100 (see FIG. 6), the CPU 12 advances to S200, in which the CPU 12 performs a printing process. A detailed procedure of the printing process is as illustrated in FIG. 8. Specifically, the CPU 12 first determines whether a print request is issued (S210), namely, whether a print request is issued by the PC 6, whether a print request for printing of an image scanned by the scanner unit 18 is issued, or whether a print request for printing of facsimile data is issued by the facsimile unit 19.

When a print request is not issued (S210: No), the printing process is terminated. Meanwhile, when a print request is issued (S210: Yes), the CPU 12 refers to the number of sheets to be printed in response to the print request and the currently remaining number of printable sheets that is stored as print history information (S215). The CPU 12 determines, based on the numbers referred to in S215, whether the remaining number of printable sheets is insufficient, namely whether the currently remaining number of printable sheets is less than the requested number of sheets to be printed (S220).

When the remaining number of printable sheets is not insufficient (S220: No), the CPU 12 goes to S255, in which the CPU 12 causes the printer unit 17 to perform a printing operation in response to the print request. After the printing operation, the CPU 12 updates the number of printed sheets and the remaining number of printable sheets based on the number of sheets actually printed in the printing operation (S260). In addition, the CPU 12 issues a similar update request to the server 5 (S265). Thereby, the print history information is updated in both of the MFP and the server 5 after the printing operation.

Meanwhile, when determining in S220 that the remaining number of printable sheets is insufficient (S220: Yes), the CPU 12 determines whether the print request is directed to the FAX recording (S225). When the print request is not directed to the FAX recording (S225: No), the CPU 12 notifies the user that the MFP cannot perform a printing operation due to lack of the remaining number of printable sheets (S270). Then the CPU 12 terminates the printing process. The notification is carried out, e.g., with a predetermined message displayed on the display unit 21.

When the print request is directed to the FAX recording (S225: Yes), the CPU 12 issues a transfer request to the server 5 (S230). Specifically, since the remaining number of printable sheets is inadequate to perform a printing operation, the CPU 12 requests the server 5, with a shortfall in the remaining number of printable sheets a request number, to transfer at least part of the maximum numbers of printable sheets from the other MFPs to the requestor MFP.

After that, the CPU 12 waits for a request (a transfer instruction) for updating (increasing) of the maximum number of printable sheets to be transmitted by the server 5 in response to the transfer request (S235). When receiving from the server 5 a request for updating of the maximum number of printable sheets (S235: Yes), in response to the request, the CPU 12 updates the maximum number of printable sheets and the remaining number of printable sheets by the transferred number corresponding to the shortfall (S240).

Then, the CPU 12 updates (increments by one) the number of times to reach the maximum (S245). In the subsequent step S250, the CPU 12 determines whether the remaining number of printable sheets is insufficient even after the updating in S240, namely, whether the transferred number of printable sheets is inadequate to make up for the requested number. When the remaining number of printable sheets is insufficient even after the updating in S240 (S250: Yes), the CPU 12 notifies the user that the MFP cannot perform a printing operation due to lack of the remaining number of printable sheets (S270). Then, the CPU 12 executes an operation for updating the print history information (S265), and thereafter terminates the printing process. Thereby, although a printing operation is not performed, the number of times to reach the maximum stored in the server 5 is updated.

Meanwhile, when the remaining number of printable sheets becomes equal to or more than the requested number (S250: No), the CPU 12 performs S255 and the following steps. Specifically, the CPU 12 performs a printing operation (S255), and following the printing operation, executes operations for updating the print history information (S260 and S265).

Thus, each of the MFPs 1 to 4 of the first embodiment updates the number of times to reach the maximum when issuing a transfer request to the server 5 due to lack of the remaining number of printable sheets, regardless of whether the MFP performs a printing operation. Hence, in other words, the number of times to reach the maximum is regarded as the number of times that the CPU 12 determines that the remaining number of printable sheets is insufficient in S220. Therefore, the CPU 12 may perform the operation of updating the number of times to reach the maximum in S245 after making the affirmative determination in S220 that the remaining number of printable sheets is insufficient (S220: Yes) (prior to S225).

(3-2) MFP Management Process by Server

Subsequently, an MFP management process to be executed by the server 5 will be described with reference to FIG. 9. In the server 5, after being booted, the CPU 32 of the controller 31 reads out a program for the MFP management process stored on the ROM 33, and performs the MFP management process in accordance with the program.

After launching the MFP management process, the CPU 32 first determines whether the current time has been 0 o'clock, based on time information provided by the clock 16 (S310). When the current time has not yet been 0 o'clock (S310: No), the CPU 32 goes to S320. Meanwhile, when the current time has been 0 o'clock (S310: Yes), the CPU 32 instructs each of the MFPs 1 to 4 to configure initial settings of the maximum number of printable sheets and the remaining number of printable sheets (S315). Specifically, the CPU 32 instructs each of the MFPs 1 to 4 to reset the maximum number of sheets printable each day, the number of printed sheets, and the remaining number of printable sheets to 100 sheets, 0 sheet, and 100 sheets, respectively. It is noted that the CPU 32 also resets the print history information of each of the MFPs 1 to 4 that is managed by the server 5, at the time when issuing the initial setting request in S315.

In the subsequent step S320, the CPU 32 determines whether a request for updating of the print history information is received from any of the MFPs 1 to 4. At this time, when receiving from any of the MFPs 1 to 4 a request for updating of the average number of printed sheets in S140 of the maximum number updating process (see FIG. 7) and/or a request for updating of the print history information in S265 of the printing process (see FIG. 8) (S320: Yes), the CPU 32 updates the print history information managed by itself (server 5) in response to the request (S325), and then goes to S330. Meanwhile, when not receiving a request for updating of the print history information (S320: No), the CPU 32 goes to S330.

In S330, the CPU 32 determines whether a request for transfer of the maximum number of printable sheets is received from any of the MFPs 1 to 4. When not receiving a transfer request (S330: No), the CPU 32 goes back to S310. Meanwhile, when receiving a transfer request (S330: Yes), the CPU 32 requests each of MFPs 1 to 4 to send the current print history information managed by each MFP (S335).

Then, when acquiring the requesting print history information from each of the MFPs 1 to 4 (S340: Yes), based on the print history information acquired, the CPU 32 selects an MFP that has the minimum average number of sheets printed each day in the past among the MFPs other than the MFP as a transfer requestor, and determines whether the selected MFP currently has a remaining number of printable sheets which is equal to or more than the requested number of printable sheets to be transferred in response to the transfer request (S345).

At this time, when the selected MFP has a remaining number of printable sheets which is equal to or more than the number requested by the transfer request (S345: Yes), the CPU 32 determines the selected MFP as a transfer source, and sets the requested number as a number of printable sheets to be transferred from the transfer source MFP determined (S350). In this case, since the determined MFP can solely meet the transfer request, the single MFP determined as a transfer source is determined as a final transfer source MFP.

Then, the CPU 32 requests the transfer source MFP to update the maximum number of printable sheets based on the number of printable sheets set in S350 to be transferred (S355). Namely, the CPU 32 issues to the transfer source MFP a transfer instruction to transfer to the server 5 at least part of the maximum number of printable sheets that corresponds to the requested number. Thereby, in the transfer source MFP, the maximum number of printable sheets and the remaining number of printable sheets decrease by the requested number, respectively, in response to the transfer instruction.

Further, the CPU 32 requests the transfer destination MFP (i.e., the transfer requestor) to update the maximum number of printable sheets based on the total number of printable sheets to be transferred from the transfer source MFP (S360). Namely, the CPU 32 issues to the MFP as a transfer destination a transfer instruction to accept the number of printable sheets that corresponds to the requested number. Thereby, in the MFP as a transfer destination, in response to the transfer instruction, the maximum number of printable sheets and the remaining number of printable sheets are increased by the requested number, respectively. Thus, through S355 and S360, achieved is transfer of at least part of the maximum number of printable sheets from the transfer source MFP to the transfer destination MFP via the server 5.

After that, the CPU 32 updates the print history information of each of the MFPs 1 to 4 that is managed by itself (S365), and again goes back to S310. Namely, the CPU 32 updates the respective pieces of the print history information of the transfer source MFP and the transfer destination MFP in accordance with the aforementioned transfer of the number of printable sheets.

Meanwhile, when the selected MFP of the minimum average number of printed sheets does not have a remaining number of printable sheets which is equal to or more than the number requested by the transfer request (S345: No), it is impossible to make up for all the number requested by the transfer request only with the remaining number of printable sheets of the selected MFP.

In this case, the CPU 32 first selects the MFP of the minimum average number of printed sheets as a transfer source MFP, and sets all of the currently remaining number of printable sheets as a number of printable sheets to be transferred from the transfer source MFP (S370). Then, the CPU 32 calculates a residual necessary number (shortfall) that is currently required for making up for the number requested by the transfer request (S375). Specifically, the CPU 32 calculates the residual necessary number of printable sheets by subtracting from the number requested by the transfer request the remaining number of printable sheets of the transfer source MFP determined in S370 (i.e., the number of printable sheets to be transferred from the transfer source MFP).

In the subsequent step S380, the CPU 32 extracts an MFP of the minimum average number of printed sheets among the MFPs other than one or more MFPs that have ever been selected as transfer source MFPs. Then, the CPU 32 determines whether the extracted MFP has the remaining number of printable sheets that is equal to or more than the necessary number calculated in S375 (S385).

When the extracted MFP has the remaining number of printable sheets that is equal to or more than the necessary number calculated in S375 (S385: Yes), the CPU 32 determines the extracted MFP as an additional transfer source MFP, and sets the necessary number as a number of printable sheets to be transferred from the extracted MFP (S390). Thereby, a plurality of MFPs, i.e., the transfer source MFPs determined in S370 and S390 are determined as final transfer source MFPs.

Thus, when a plurality of transfer source MFPs are determined, the CPU 32 transfers the number of printable sheets from the transfer source MFPs to the transfer destination MFP by executing S355 and the following steps. Specifically, in S355, the CPU 32 requests each of the plurality of transfer source MFPs to update the maximum number of printable sheets of each transfer source MFP based on the number transferred from each of the transfer source MFPs (set in S370 or S390). In S360, the CPU 32 requests the transfer destination MFP to update the maximum number of printable sheets of the transfer destination MFP based on the total number of printable sheets transferred from the plurality of transfer source MFPs.

In the meantime, when determining in S385 that even the MFP extracted in S380 does not have the remaining number of printable sheets that is equal to or more than the necessary number calculated in S375 (S385: No), the CPU 32 determines the extracted MFP as a transfer source MFP, and sets all of the currently remaining number of printable sheets of the transfer source MFP newly determined as the number of printable sheets to be transferred from the transfer source MFP (S395). Then, the CPU 32 recalculates a residual necessary number (shortfall) that is currently required for making up for the number requested by the transfer request (S400). Specifically, the CPU 32 newly calculates the residual necessary number of printable sheets by subtracting from the currently necessary number the remaining number of printable sheets of the transfer source MFP selected in S395 (i.e., the number of printable sheets to be transferred from the transfer source MFP).

Then, the CPU 32 determines whether all MFPs (each of which has a certain remaining number of printable sheets), other than the MFP as a transfer requestor (i.e., a transfer destination), are determined as transfer source MFPs (S405). When all MFPs other than the MFP as a transfer requestor are not determined as transfer source MFPs (S405: No), the CPU 32 goes back to S380. Meanwhile, when all MFPs other than the MFP as a transfer requestor are determined as transfer source MFPs (S405: Yes), the CPU 32 determines all transfer source MFPs that have selected by then are determined as final transfer source MFPs, and thereafter goes to S355.

(4) Effects of First Embodiment

As described hereinabove, in the printing system 10 of the first embodiment, in the case where when any of the MFPs 1 to 4 performs a printing operation, the remaining number of printable sheets of the MFP is inadequate to perform the printing operation, the MFP can have at least part of the maximum number of printable sheets transferred from each of one or more other MFPs via the server 5.

When receiving a transfer request from any of the MFPs 1 to 4, the server 5 selects as a transfer source MFP an MFP of the minimum average number of sheets printed each day among the MFPs other than the MFP as a transfer requestor. Further, the server 5 sets at least part of the currently remaining number of printable sheets of the transfer source MFP, as the number of printable sheets transferred from the transfer source MFP. In this case, when the remaining number of printable sheets of this single transfer source MFP is inadequate to make up for the number requested by the transfer request, the server 5 further selects one or more MFPs as additional transfer source MFPs, sequentially in ascending order of the average number of printed sheets, until the requested number is filled. Then, the server 5 transfers, to the transfer destination MFP, the total number of printable sheets transferred from one or more MFPs which are finally determined as transfer source MFPs. Thereby, when the transfer destination MFP has all the requested number of printable sheets transferred thereto, the MFP performs a printing operation. Meanwhile, when the total number of printable sheets transferred to the transfer destination MFP is less than the number requested by the transfer request, the transfer destination MFP informs the user that the MFP cannot perform a printing operation due to lack of the maximum number of printable sheets thereof.

Thus, according to the printing system 10 in the first embodiment, an MFP, issuing a transfer request for a reason that the MFP does not have a sufficient remaining number of printable sheets, has at least part of the maximum number of printable sheets transferred from an MFP, which the server 5 determines as a transfer source MFP appropriately in consideration of how frequently each MFP performs a printing operation each day.

Therefore, it is possible to minimize influences that may be exercised on the transfer source MFP (e.g., the number of sheets actually printed by the transfer source MFP may reach the maximum number of printable sheets thereof, which is transferred, too early). In addition, it is possible to avoid inconvenience that transfer of at least part of the maximum number of printable sheets from the transfer source MFP to the transfer destination MFP may cause the user of the transfer source MFP.

Further, in the first embodiment, the server 5 uses the average number of sheets printed each day in the past as a criterion for selecting a transfer source MFP. Namely, the server 5 selects one or more MFPs as transfer source MFPs, in ascending order of the average number of printed sheets. The reason why the average number of printed sheets is used as a criterion in this way is that the average number of printed sheets is one of optimum parameters which make it possible to relatively evaluate (i.e., compare) frequencies of printing operations between MFPs. Therefore, the MFP which has issued a transfer request can have at least part of the maximum number of printable sheets transferred from more appropriate MFPs.

Furthermore, in the case where the requested number of printable sheets cannot be filled only with the remaining number of printable sheets of the MFP of the minimum average number of printed sheets, the server 5 selects other MFPs as additional transfer source MFPs in ascending order of the average number of printed sheets. Hence, the MFP which has issued a transfer request can have the number of printable sheets transferred from the other MFPs, up to the sum of the remaining numbers of printable sheets of the other MFPs. Thus, it is possible to reduce the risk that the transfer destination MFP may not perform a printing operation due to lack of the remaining number of printable sheets.

Further, in the printing system 10 of the first embodiment, the server 5 manages the print history information of each of the MFPs 1 to 4. Therefore, it is possible to attain such a more efficient printing system that the server 5 manages each of the MFPs 1 to 4 in an integrated manner.

Further, in the printing system 10 of the first embodiment, each of the MFPs 1 to 4 does not issue a transfer request to make up for a shortfall of the remaining number of printable sheets in response to every print request. Each of the MFPs 1 to 4 is configured to, only when printing facsimile data, issue a transfer request to the server 5 and have the requested number of printable sheets transferred from one or more other MFPs. Therefore, each MFP can have a required number of printable sheets transferred while minimizing influences that may be exercised on the other MFPs.

Especially, since facsimile data is generally received at a certain moment without relation to user's intention, when an MFP that has once received facsimile data cannot print the facsimile data due to lack of the remaining number of printable sheets, it might exercise undesirable influences on the user. Therefore, when each MFP of the printing system is configured, in the aforementioned manner, to perform printing of at least facsimile data in response to a transfer request, it is possible to prevent received facsimile data from being left unprinted.

Further, in the first embodiment, when the total number of printable sheets, which an MFP that has issued a transfer request has transferred from the other MFPs, is insufficient for the requested number (shortfall), the MFP notifies that the total number of printable sheets is insufficient. Therefore, it is possible to present a user-friendly printing system.

[Second Embodiment]

Subsequently, a printing system of a second embodiment will be described. A printing system of the second embodiment is different from the printing system 10 of the first embodiment in the print history information stored and managed on the EEPROM 15 of each of the MFPs 1 to 4 and the print history information stored and managed on the EEPROM 35 of the server 5. The above differences are accompanied by slight differences between the first embodiment and the second embodiment in the print control process to be executed by each of the MFPs 1 to 4 and the MFP management process to be executed by the server 5. Other configurations of the MFPs 1 to 4 and the server 5 are generally the same between the first embodiment and the second embodiment. Therefore, the following description will be provided, focusing on the differences of the second embodiment from the first embodiment.

(1) Transfer of Number of Printable Sheets between MFPs via Server

First, explanation will be given about print history information managed by each of the MFPs 1 to 4 of the printing system in the second embodiment, referring to FIG. 10. In the printing system of the second embodiment, the print history information is managed in each of the MFPs 1 to 4, individually for each user. Specifically, for example, under an assumption that there area five users A, B, C, D, and E registered in the printing system, each of the MFPs 1 to 4 manages individual print history information for each of the five users. Therefore, in the server 5 as well, the print history information of each MFP is stored and managed individually for each user.

As exemplified in FIGS. 10A and 10B, the print history information of the user A is managed in each of the first MFP 1 and the second MFP 2. As illustrated in FIG. 10A, the current print history information of the user A in the first MFP 1 shows that three printing operations have been performed since the initial setting of the maximum number of printable sheets at 0 o'clock, and consequently, the cumulative number of printed sheets and the remaining number of printable sheets become 98 and 2, respectively. On the other hand, as illustrated in FIG. 10B, the current print history information of the user A in the second MFP 2 shows that three printing operations have been performed since the initial setting of the maximum number of printable sheets at 0'clock, and consequently, the cumulative number of printed sheets and the remaining number of printable sheets become 33 and 67, respectively.

In this state, when the user A issues from the PC 6 a print request for printing of 5 sheets with the first MFP 1, since the current remaining number of printable sheets is two and three more printable sheets are needed, the first MFP 1 cannot perform a printing operation in response to the print request of the user A without any transfer of the number of printable sheets.

To settle the above situation, in the second embodiment as well, the first MFP 1 has to have three more printable sheets transferred to the maximum number of printable sheets thereof from one or more of the MFPs 2 to 4. In such a case, the server 5 selects one or more MFPs as transfer source MFPs in ascending order of the average number of printed sheets in the same general manner as the first embodiment. In this respect, however, it is noted that transfer of a requested number of printable sheets is achieved between the maximum numbers of printable sheets assigned to the same user of different MFPs.

In other words, when receiving from the first MFP 1 a transfer request for transfer of at least part of the maximum number of printable sheets, based on the transfer request from the user A of the first MFP 1, the server 5 requests and acquires the print history information of the user A from each of the MFPs 2 to 4. Then, the server 5 selects as a transfer source MFP an MFP of the minimum average number of printed sheets among the MFPs 2 to 4.

FIGS. 10A and 10B exemplify a case where the second MFP 2 is selected as a transfer source MFP. Since the current remaining number of printable sheets for the user A of the second MFP is 64 and enough to make up for the number of printable sheets requested by the first MFP 1, the server 5 finally selects the second MFP 2 as a transfer source MFP. Then, the server 5 requests the second MFP 2 to transfer three sheets from the maximum number of printable sheets assigned to the user A of the second MFP 2 to the first MFP 1.

Figure 10:

Consequently, as illustrated in FIG. 10, the maximum number of printable sheets and the remaining number of printable sheets for the user A of the first MFP 1 increase to 103 and 5, respectively, so that a printing operation can be performed in response to the print request for printing of 5 sheets issued by the PC 6.

(2) Various Control Processes Executed in Printing System

Next, concrete explanation will be provided with reference to FIGS. 11 to 13, to set forth various control processes to be executed in the printing system of the second embodiment.

(2-1) Print Control Process Executed by MFP

Initially, a maximum number updating process to be executed in S100 by each of the MFPs 1 to 4 will be described with reference to FIG. 11. The CPU 12 of each of the MFPs 1 to 4 determines whether a request for print history information for a designated user is received from the server 5 (S510). When a request for print history information for a designated user is not received from the server 5 (S510: No), the CPU 12 goes to S520. Meanwhile, when a request for print history information for a designated user is received from the server 5 (S510: Yes), the CPU 12 sends print history information for the designated user (S515). For instance, when receiving a request for print history information for the user A, the CPU 12 transmits only the print history information for the user A. It is noted that concrete data items contained in the print history information to be transmitted are the same as shown in S115 of FIG. 7.

In the subsequent step S520, the CPU 12 determines whether a request for updating of the maximum number of printable sheets assigned to a designated user is received from the server 5. It is noted that the update request issued by the server 5 corresponds to a below-mentioned operation executed by the server 5 in S715 or S755 of FIG. 13. When a request for updating of the maximum number of printable sheets assigned to a designated user is not received from the server 5 (S520: No), the CPU 12 goes to S530. Meanwhile, when a request for updating of the maximum number of printable sheets assigned to a designated user is received from the server 5 (S520: Yes), the CPU 12 updates the print history information for the designated user among the print history information managed by itself (S525).

Then, the CPU 12 determines whether it is currently 0 o'clock (S530). When it is 0 o'clock (S530: Yes), the CPU 12 updates the average number of sheets printed each day for each user in the past (S535). Thereafter, the CPU 12 requests the server 5 to update the average number of printed sheets for each user of the MFP in the print history information managed by the server 5 (S540).

Subsequently, a printing process will be described with reference to FIG. 12. The CPU 12 of each of the MFPs 1 to 4 first determines whether a print request is issued by a registered user (S610). When a print request is issued by a registered user (S610: Yes), the CPU 12 refers to the number of sheets to be printed based on the print request and the currently remaining number of printable sheets for the user that is stored as print history information (S615). The CPU 12 determines, based on the numbers referred to in S615, whether the remaining number of printable sheets is insufficient, namely whether the currently remaining number of printable sheets for the user is less than the number of sheets to be printed based on the print request (S620).

When the remaining number of printable sheets is not insufficient (S620: No), the CPU 12 goes to S650, in which the CPU 12 causes the printer unit 17 to perform a printing operation in response to the print request. After the printing operation, the CPU 12 updates the number of printed sheets and the remaining number of printable sheets for the user based on the number of sheets actually printed in the printing operation (S655). In addition, the CPU 12 issues to the server 5 a similar update request for updating of the print history information for the user of the MFP (S660). Thereby, the print history information for the user of the MFP is updated in both of the MFP and the server 5 after the printing operation.

Meanwhile, when determining in S620 that the remaining number of printable sheets is insufficient (S620: Yes), the CPU 12 issues to the server 5 a transfer request for transfer of at least part of the maximum number of printable sheets with designation of the user (S625). Namely, since the remaining number of printable sheets for the user is inadequate to perform a printing operation, the CPU 12 requests the server 5 to transfer at least part of the maximum numbers of printable sheets for the user from one or more other MFPs to the requestor MFP, with the shortfall in the remaining number of printable sheets as a requested number of printable sheets to be transferred based on the transfer request.

After that, the CPU 12 waits for a request (transfer instruction) for update of the maximum number of printable sheets to be transmitted by the server in response to the transfer request (S630). When receiving a request for updating of the maximum number of printable sheets for the user (S630: Yes), the CPU 12 updates the maximum number of printable sheets and the remaining number of printable sheets for the user by the number of printable sheets transferred, in accordance with the request (transfer instruction) (S635). Thereby, at the MFP side, the maximum number of printable sheets and the remaining number of printable sheets for the user are increased.

Then, the CPU 12 updates the number of times to reach the maximum for the user in the print history information managed by the CPU 12 (S640). Subsequently, the CPU 12 determines whether the remaining number of printable sheets is insufficient even after the updating in S635 (S645). When the remaining number of printable sheets for the user is insufficient even after the updating in S635 (S645: Yes), the CPU 12 notifies the user that a printing operation cannot be performed due to lack of the remaining number of printable sheets (S665). After that, the CPU 12 issues, to the server 5, a request for updating of the print history information for the user of the MFP (S660). Then, the CPU 12 terminates the printing process. Meanwhile, when the remaining number of printable sheets for the user is sufficient (S645: No), the CPU 12 executes S650 and the following steps.

(2-2) MFP Management Process Executed by Server

Next, an MFP management process to be executed by the server 5 will be described with reference to FIG. 13. As illustrated in FIG. 13, the CPU 32 of the server 5 first determines whether it is currently 0 o'clock (S710). When it is currently 0 o'clock (S710: Yes), the CPU 32 issues to each of the MFPs 1 to 4 a request for initial setting of the maximum number of printable sheets and the remaining number of printable sheets for each user (S715). Specifically, the CPU 32 requests each of the MFPs 1 to 4 to reset the maximum number of printable sheets for each user, the number of printed sheets for each user, and the remaining number of printable sheets for each user to 100, 0, and 100, respectively. Additionally, in a similar manner, the CPU 32 updates the print history information for each user of each of the MFPs 1 to 4 that is managed by the server 5, at the time of the update request in S715.

In the subsequent step S720, the CPU 32 determines whether a request for updating of print history information for a designated user is received from any of the MFPs 1 to 4. When a request for updating of print history information for a designated user is received from any of the MFPs 1 to 4 (S720: Yes), the CPU 32 updates the print history information for each user that is managed by the server 5, in response to the update request (S725), and thereafter goes to S730. Meanwhile, when a request for updating of print history information for a designated user is not received from any of the MFPs 1 to 4 (S720: No), the CPU 32 goes directly to S730.

In S730, the CPU 32 determines whether a transfer request for transfer of at least part of the maximum number of printable sheets for a designated user is received from any of the MFPs 1 to 4. When a transfer request is received from any of the MFPs 1 to 4 (S730: Yes), the CPU 32 requests each MFP to send print history information for the designated user among the current print history information managed by each MFP (S735).

When acquiring the requested print history information for the designated user from each MFP (S740: Yes), the CPU 32, based on the print history information acquired, selects an MFP of the minimum average number of sheets printed each day for the designated user in the past among the MFPs other than the MFP which has issued the transfer request, and determines whether the remaining number of printable sheets for the designated user of the MFP is equal to or more than the number requested by the transfer request (S745).

At this time, when the remaining number of printable sheets for the designated user of the MFP is equal to or more than the number requested by the transfer request (S745: Yes), the CPU 32 selects the MFP as a transfer source MFP, and sets the requested number, of the current maximum number of printable sheets for the designated user of the MFP, as a transferred number (S750).

Then, the CPU 32 requests the MFP selected as a transfer source MFP to update the maximum number of printable sheets for the designated user on the basis of the transferred number set in S750 (S755). In other words, the CPU 32 issues to the transfer source MFP a transfer instruction to transfer the requested number of the maximum number of printable sheets for the designated user to the server side. Thereby, in accordance with the transfer instruction, at the side of the transfer source MFP, the maximum number of printable sheets and the remaining number of printable sheets for the designated user are decreased by the requested number, respectively.

Further, the CPU 32 requests the transfer destination MFP, i.e., the transfer requestor MFP to update the maximum number of printable sheets based on the total number of printable sheets transferred from the transfer source MFP (S760). Namely, the CPU 32 issues to the transfer destination MFP a transfer instruction to accept the number of printable sheets that corresponds to the requested number. Thereby, at the side of the transfer destination MFP, in accordance with the transfer instruction, the maximum number of printable sheets and the remaining number of printable sheets for the designated user are increased by the requested number, respectively. Thus, through S755 and S760, transfer of the requested number of printable sheets is attained from the maximum number of printable sheets for the designated user of the transfer source MFP to the maximum number of printable sheets for the same user of the transfer destination MFP.

Thereafter, the CPU 32 updates the information for the designated user in the print history information of each of the MFPs 1 to 4 that is managed by the server 5 (S765). After that, the CPU 32 goes back to S710.

On the other hand, when determining in S745 that the remaining number of printable sheets for the designated user of the MFP is less than the number requested by the transfer request (S745: No), the CPU 32 first selects an MFP of the minimum average number of printed sheets as a transfer source MFP, and sets all the currently remaining number of printable sheets as a number to be transferred from the transfer source MFP (S770). Then, the CPU 32 calculates a residual necessary number (shortfall) that is currently required for making up the requested number (S775). Specifically, the CPU 32 calculates the residual necessary number of printable sheets by subtracting from the requested number the remaining number of printable sheets for the designated user of the transfer source MFP selected in S770 (i.e., the number of printable sheets to be transferred from the transfer source MFP).

In the subsequent step S780, the CPU 32 extracts an MFP of the minimum average number of printed sheets for the designated user among the MFPs other than the MFPs selected as transfer source MFPs by then. Then, the CPU 32 determines whether the remaining number of printable sheets for the designated user of the extracted MFP is equal to or more than the residual necessary number calculated in S775 (S785).

When the remaining number of printable sheets for the designated user of the extracted MFP is equal to or more than the residual necessary number (S785: Yes), the CPU 32 selects the MFP as an additional transfer source MFP, and sets the necessary number of the current maximum number of printable sheets for the designated user of the MFP as a transferred number (S790).

Thus, when the additional transfer source MFP is determined, the CPU 32 transfers the requested number from the maximum numbers of printable sheets for the designated user of the transfer source MFPs to the maximum number of printable sheets for the same user of the transfer destination MFP.

Meanwhile, when determining that the remaining number of printable sheets for the designated user of the extracted MFP is less than the residual necessary number even after extraction of the MFP in S780 (S785: No), the CPU 32 selects the extracted MFP as a transfer source MFP, and sets all the remaining number of printable sheets for the designated user of the MFP selected as a transfer source MFP as a number to be transferred from the transfer source MFP (S795). Then, the CPU 32 recalculates a residual necessary number that is currently required for making up the requested number (S800). Specifically, the CPU 32 newly calculates the residual necessary number of printable sheets by subtracting from the currently necessary number the remaining number of printable sheets for the designated user of the transfer source MFP selected in S795 (i.e., the number of printable sheets to be transferred from the transfer source MFP).

In the subsequent step S805, the CPU 32 determines whether all MFPs (each of which has a certain remaining number of printable sheets), other than the MFP as a transfer requestor, are determined as transfer source MFPs. When all MFPs other than the MFP as a transfer requestor are not determined as transfer source MFPs (S805: No), the CPU 32 goes back to S780. Meanwhile, when all MFPs other than the MFP as a transfer requestor are determined as transfer source MFPs (S805: Yes), the CPU 32 determines all transfer source MFPs that have selected by then are determined as final transfer source MFPs, and thereafter goes to S755.

(3) Effects of Second Embodiment

According to the aforementioned printing system of the second embodiment, transfer of a requested number of printable sheets is achieved between the maximum numbers of printable sheets assigned to the same user of different MFPs via the server 5. Therefore, it is possible to prevent any influences from being exercised on the remaining numbers of printable sheets for other users.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

In the aforementioned first embodiment, when the remaining number of printable sheets for any of the MFPs 1 to 4, which receives a print request, is inadequate to perform a printing operation in response to the print request, the MFP issues a transfer request to the server 5 only when the print request is directed to the FAX recording (see S225 to S230 in FIG. 8). However, a transfer request may be issued even when the print request is not directed to the FAX recording.

Considering that the FAX recording is preferentially performed relative to other types of printing operations, the printing system 10 of the first embodiment is adapted such that any of the MFPs, which receives a print request directed to the FAX recording, performs a printing operation in response to the print request even though the MFP has to have at least part of the maximum numbers of printable sheets transferred from one or more other MFPs. Further, when the MFP cannot perform a printing operation in response to a print request which is not directed to the FAX recording, due to lack of the remaining number of printable sheets, the MFP accept that situation. Thus, it is possible to minimize influences that may be exercised on other MFPs.

However, the printing system 10 may be configured such that any of the MFPs, which receives a print request, may issue a transfer request only when the print request is directed to a printing operation of the type other than the FAX recording, or only when the print request is directed to one of the FAX recording and one or more other types of printing operations. Alternatively, the MFP may issue a transfer request when the print request is directed to one of all types of printing operations.

In each of the aforementioned embodiments, the server 5 employs the average number of printed sheets as a criterion for selecting a transfer source MFP, and selects transfer source MFPs sequentially in ascending order of the average number of printed sheets (see S345 in FIG. 9 and S745 in FIG. 13). However, the criterion is not limited to the average number of printed sheets as far as the server 5 can appropriately select one or more transfer source MFPs based on comparison of the frequencies of printing operations ever performed between MFPs.

Specifically, for instance, as illustrated in FIG. 14 (especially, see the steps S346 and S381), the server 5 may select one or more transfer source MFPs in ascending order of the number of times to reach the maximum (i.e., the number of times that the number of sheets printed with each MFP has ever reached the maximum number of printable sheets assigned to the MFP). An MFP of a smaller number of times to reach the maximum is likely to be an MFP of a low frequency of printing operations. Therefore, when a transfer source MFP is selected with the number of times to reach the maximum as a criterion, it can provide the same effects as the aforementioned embodiments.

In each of the aforementioned embodiments, when a single MFP of the minimum average number of printed sheets does not have a remaining number of printable sheets enough to make up for a requested number based on a transfer request issued by an MFP, one or more additional MFPs are selected as transfer source MFPs. However, unlike the above method, when a single MFP of the minimum average number of printed sheets does not have a sufficient remaining number of printable sheets, the server 5 may determine at that time that transfer of a number of printable sheets is impossible.

Alternatively, as illustrated in FIG. 15 (especially, see the steps S410 and S420), when a single MFP of the minimum average number of printed sheets does not have a sufficient remaining number of printable sheets, the server 5 may determine whether a different MFP of the minimum number of times to reach the maximum has a sufficient remaining number of printable sheets. Then, when determining that the different MFP has a sufficient remaining number of printable sheets, the server 5 may select the different MFP as a transfer source MFP.

In this respect, however, it may be assumed that the single MFP of the minimum number of times to reach the maximum does not have a remaining number of printable sheets enough to make up for the requested number. In such a case, the server 5 may determine at that moment that transfer of a number of printable sheets is impossible, or search a transfer source MFP based on a different criterion.

In each of the aforementioned embodiments, the server 5 configures the initial settings of the maximum number of printable sheets and the remaining number of printed sheets for each of the MFPs 1 to 4 every 0 o'clock (see S315 in FIGS. 9 and 5715 in FIG. 13). Further, concurrently, each of the MFPs 1 to 4 updates the average number of printed sheets (see S135 in FIG. 7 and S535 in FIG. 11). However, the timing for the initial setting and the updating is not limited to 0 o'clock.

Furthermore, the number of the MFPs included in the printing system is not limited to four. Additionally, in a printing system configured with a plurality of MFPs connected with a server via a LAN, all of the MFPs may not necessarily be managed by the server with respect to the maximum number of printable sheets. In other words, even in a printing system that includes a plurality of MFPs managed by the server and an MFP which is not managed by the server, aspects of the present invention can be applied at least between the server and the plurality of MFPs managed by the server.

What is claimed is:

1. A printing system comprising a server and a plurality of printing devices connected with the server via a network,
wherein each of the plurality of printing devices comprises:
a setting unit configured to set a maximum number of printable sheets up to which the printing device is permitted to perform a printing operation;
a printer unit configured to, in response to acceptance of a print request, perform a printing operation as far as a cumulative number of sheets that have ever been printed is within the maximum number of printable sheets set by the setting unit;
a first determining unit configured to, upon receipt of the print request, determine whether a remaining number of printable sheets is less than a total number of sheets to be printed based on the print request, the remaining number of printable sheets being defined by subtracting the cumulative number of sheets that have ever been printed from the maximum number of printable sheets;
a transfer requesting unit configured to issue a transfer request to the server when the first determining unit determines that the remaining number of printable sheets is less than the total number of sheets to be printed based on the print request; and
an update unit configured to, in response to a transfer instruction received from the server, update the maximum number of printable sheets set by the setting unit, and
wherein the server comprises:
a transfer source selecting unit configured to, in response to the transfer request issued by the transfer requesting unit of a first printing device, select from the printing devices other than the first printing device, a second printing device that cedes at least part of the maximum number of printable sheets set for the second printing device, based on respective frequencies of printing operations performed by the printing devices other than the first printing device; and
a transfer instructing unit configured to issue the transfer instruction to each of the first printing device and the second printing device, the transfer instruction causing the first printing device to increase the maximum number of printable sheets for the first printing device and causing the second printing device to decrease the maximum number of printable sheets for the second printing device.

2. The printing system according to claim 1,
wherein the transfer source selecting unit is configured to select, as the second printing device, a printing device having a minimum frequency of printing operations.

3. The printing system according to claim 2,
wherein the transfer source selecting unit is configured to select, as the second printing device, one of a printing device having a minimum average number of sheets printed for a predetermined period of time and a printing device having a minimum number of times the first determining unit thereof has ever determined that the remaining number of printable sheets is less than the total number of sheets to be printed based on a past print request.

4. The printing system according to claim 3,
wherein the transfer requesting unit is configured to issue the transfer request with at least a shortfall as a requested number of printable sheets to be transferred, the shortfall being defined by subtracting the remaining number of printable sheets from the total number of sheets to be printed based on the print request,
wherein the transfer source selecting unit is configured to select, as the second printing device, the printing device having the minimum average number of sheets printed for the predetermined period of time, and
wherein the transfer source selecting unit is further configured to, when the remaining number of printable sheets for the second printing device is less than the requested number of printable sheets to be transferred, select one or more additional second printing devices in ascending order of the average number of sheets printed for the predetermined period of time.

5. The printing system according to claim 3,
wherein the transfer requesting unit is configured to issue the transfer request with at least a shortfall as a requested number of printable sheets to be transferred, the shortfall being defined by subtracting the remaining number of printable sheets from the total number of sheets to be printed based on the print request,
wherein the transfer source selecting unit is configured to select, as the second printing device, the printing device having the minimum number of times the first determining unit thereof has ever determined that the remaining number of printable sheets is less than the total number of sheets to be printed based on the past print request, and
wherein the transfer source selecting unit is further configured to, when the remaining number of printable sheets for the second printing device is less than the requested number of printable sheets to be transferred, select one or more additional second printing devices in ascending order of the number of times the first determining unit of each printing device has ever been determined that the remaining number of printable sheets is less than the total number of sheets to be printed based on the past print request.

6. The printing system according to claim 3,
wherein the transfer requesting unit is configured to issue the transfer request with at least a shortfall as a requested number of printable sheets to be transferred, the shortfall being defined by subtracting the remaining number of printable sheets from the total number of sheets to be printed based on the print request,
wherein the transfer source selecting unit is configured to select, as the second printing device, the printing device having the minimum average number of sheets printed for the predetermined period of time, and
wherein the transfer source selecting unit is further configured to, when the remaining number of printable sheets of the printing device having the minimum average number of sheets printed for the predetermined period of time is less than the requested number of printable sheets to be transferred, re-select as the second printing device the printing device having the minimum number of times the first determining unit thereof has ever determined that the remaining number of printable sheets is less than the total number of sheets to be printed based on the past print request.

7. The printing system according to claim 1,
wherein the server further comprises a setting instructing unit configured to issue a setting instruction to each of the plurality of printing devices, the setting instruction causing each of the printing devices to set the maximum number of printable sheets therefor, and
wherein the setting unit is configured to set the maximum number of printable sheets in response to the setting instruction received from the server.

8. The printing system according to claim 1,
wherein each of the plurality of printing devices is configured to perform a plurality of types of printing operations with the printer unit thereof, and
wherein the transfer requesting unit is configured to issue the transfer request to the server when the first determining unit determines that remaining number of printable sheets is less than the total number of sheets to be printed based on the print request, and the print request is directed to a predetermined type of printing operation.

9. The printing system according to claim 8,
wherein each of the plurality of printing devices further comprises a facsimile data receiving unit configured to receive facsimile data, and
wherein the predetermined type of printing operation is a printing operation of printing the facsimile data received by the facsimile data receiving unit.

10. The printing system according to claim 1,
wherein each of the plurality of printing devices further comprises:
a second determining unit configured to determine whether the remaining number of printable sheets is less than the total number of sheets to be printed based on the print request even after the update unit updates the maximum number of printable sheets for the printing device; and
an informing unit configured to inform that the printing device cannot perform the printing operation in response to the print request, when the second determining unit determines that the remaining number of printable sheets is less than the total number of sheets to be printed based on the print request even after the update unit updates the maximum number of printable sheets for the printing unit.

11. The printing system according to claim 1,
wherein the setting unit is configured to set a maximum number of printable sheets for each user of the printing device,
wherein the printer unit is configured to, in response to acceptance of a print request issued by a particular user, perform a printing operation as far as the cumulative number of sheets that have ever been printed is within the maximum number of printable sheets set for the particular user of the printing device,
wherein the first determining unit is configured to, upon receipt of the print request, determine whether a remaining number of printable sheets for the particular user is less than a total number of sheets to be printed based on the print request, the remaining number of printable sheets being defined by subtracting the cumulative number of sheets that have ever been printed by the particular user from the maximum number of printable sheets for the particular user, wherein the transfer requesting unit is configured to issue the transfer request to the server when the first determining unit determines that the remaining number of printable sheets for the particular user is less than the total number of sheets to be printed based on the print request, wherein the update unit is configured to, in response to the transfer instruction received from the server, update the maximum number of printable sheets for the particular user, wherein the transfer source selecting unit is configured to, in response to the transfer request issued by the transfer requesting unit of the first printing device, select from the printing devices other than the first printing device, a printing device as the second printing device that cedes at least part of the maximum number of printable sheets set for the particular user of the second printing device, based on respective frequencies of printing operations that have ever been performed by the printing devices other than the first printing device in response to print requests issued by the particular user, and wherein the transfer instructing unit is configured to issue a transfer instruction to each of the first printing device and the second printing device, the transfer instruction causing the first printing device to increase the maximum number of printable sheets for the particular user of the first printing device and causing the second printing device to decrease the maximum number of printable sheets for the particular user of the second printing device.

* * * * *